United States Patent
Zhang et al.

(10) Patent No.: US 11,622,416 B2
(45) Date of Patent: Apr. 4, 2023

(54) GROUP-BASED RELAY SELECTION FOR WIRELESS NETWORK COMMUNICATION

(71) Applicant: Telefonaktiebolaget LM Ericsson (publ), Stockholm (SE)

(72) Inventors: Congchi Zhang, Aachen (DE); Maciej Muehleisen, Eynatten (BE); Zhang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 590 days.

(21) Appl. No.: 16/330,865

(22) PCT Filed: Oct. 18, 2018

(86) PCT No.: PCT/CN2018/110726
§ 371 (c)(1),
(2) Date: Mar. 6, 2019

(87) PCT Pub. No.: WO2020/077578
PCT Pub. Date: Apr. 23, 2020

(65) Prior Publication Data
US 2021/0176820 A1 Jun. 10, 2021

(51) Int. Cl.
*H04W 88/04* (2009.01)
*H04W 4/08* (2009.01)
(Continued)

(52) U.S. Cl.
CPC .............. *H04W 88/04* (2013.01); *H04W 4/08* (2013.01); *H04W 76/14* (2018.02); *H04W 4/40* (2018.02)

(58) Field of Classification Search
CPC ......... H04W 4/08; H04W 4/40; H04W 76/14; H04W 88/04
See application file for complete search history.

(56) References Cited

U.S. PATENT DOCUMENTS

2011/0044235 A1* 2/2011 Zhang .................. H04W 40/22
370/315
2014/0198708 A1* 7/2014 Lee ....................... H04W 76/14
370/312
(Continued)

FOREIGN PATENT DOCUMENTS

CN 103596241 A 2/2014
CN 105430633 A 3/2016
(Continued)

OTHER PUBLICATIONS

D. Munir et al., "Selection of UE relay considering QoS class for public safety services in LTE—a network," The 20th Asia-Pacific Conference on Communication (APCC2014), 2014, pp. 401-405. (Year: 2014).*

(Continued)

*Primary Examiner* — Brian P Cox
(74) *Attorney, Agent, or Firm* — Sage Patent Group

(57) ABSTRACT

A radio device configures a group of further radio devices as candidate relay nodes for communication with the wireless communication network. Further, the radio device selects one or more of the further radio devices from the group as relay node for communication with the wireless communication network. Further, the radio device communicates with the wireless communication network via said one or more selected further radio devices.

24 Claims, 10 Drawing Sheets

(51) Int. Cl.
*H04W 76/14* (2018.01)
*H04W 4/40* (2018.01)

(56) References Cited

U.S. PATENT DOCUMENTS

| | | | |
|---|---|---|---|
| 2017/0223753 A1* | 8/2017 | Hoglund | H04W 76/10 |
| 2017/0325277 A1* | 11/2017 | Fujishiro | H04W 4/06 |
| 2017/0332425 A1* | 11/2017 | Tenny | H04W 74/0833 |
| 2017/0359766 A1 | 12/2017 | Agiwal et al. | |
| 2018/0027429 A1* | 1/2018 | Li | H04W 24/02 |
| | | | 455/426.1 |
| 2018/0110001 A1 | 4/2018 | Yasukawa et al. | |
| 2018/0199262 A1* | 7/2018 | Kuge | H04W 76/14 |
| 2018/0242381 A1 | 8/2018 | Wei et al. | |
| 2019/0254103 A1* | 8/2019 | Nord | H04W 4/70 |

FOREIGN PATENT DOCUMENTS

| | | | |
|---|---|---|---|
| CN | 106454992 A | | 2/2017 |
| CN | 106797673 A | | 5/2017 |
| CN | 106888494 B | * | 10/2020 |
| WO | 2016008657 A1 | | 1/2016 |
| WO | 2016185285 A1 | | 11/2016 |

OTHER PUBLICATIONS

Examination Report dated Sep. 8, 2020 for Indian Application No. 201817039793, 6 pages.
3GPP TS 22.185 V15.0.0, "3rd Generation Partnership Project; Technical Specification Group Services and System Aspects; Service requirements for V2X services; Stage 1 (Release 15)," Jun. 2018, 14 pages.
3GPP TR 22.886 V15.3.0, "3rd Generation Partnership Project; Technical Specification Group Services and System Aspects; Study on enhancement of 3GPP Support for 5G V2X Services (Release 15)," Sep. 2018, 58 pages.
3GPP TR 22.886 V16.1.1, "3rd Generation Partnership Project; Technical Specification Group Services and System Aspects; Study on enhancement of 3GPP Support for 5G V2X Services (Release 16)," Sep. 2018, 74 pages.
3GPP TS 23.303 V15.1.0, "3rd Generation Partnership Project; Technical Specification Group Services and System Aspects; Proximity-based services (ProSe); Stage 2 (Release 15)," Jun. 2018, 130 pages.
Notification of Transmittal of the International Search Report and the Written Opinion of the International Searching Authority for International Application No. PCT/CN2018/110726 dated Jul. 18, 2019.
Extended European Search Report for European Patent Application No. 18937041.4 dated May 4, 2022, 9 pages.

* cited by examiner

GROUP-BASED RELAY SELECTION FOR WIRELESS NETWORK COMMUNICATION

CROSS REFERENCE TO RELATED APPLICATION

This application is a 35 U.S.C. § 371 national stage application of PCT International Application No. PCT/CN2018/110726, filed on Oct. 18, 2018, the disclosure and content of which is incorporated by reference herein in its entirety.

TECHNICAL FIELD

The present invention relates to methods for controlling communication in a wireless communication network and to corresponding radio devices, systems, and computer programs.

BACKGROUND

In wireless communication networks, e.g., based on the LTE (Long Term Evolution) radio technology specified by 3GPP (3$^{rd}$ Generation Partnership Project), a known concept is to use a UE (user equipment) as a relay node for forwarding communication of another UE with the wireless communication network. Corresponding functionalities are for example specified in 3GPP TS 23.303 V15.1.0 (2018 June). In such scenarios a first UE, also called remote UE, communicates via a second UE, also called relay UE, with the wireless communication network. The relay UE may be connected to the network via a cellular link, e.g., based on the Uu interface of the LTE radio technology. The remote UE may be connected to the relay UE via a short range communication link, e.g., the a device-to-device (D2D) link. Such D2D link could for example be based on the sidelink (SL) mode as specified for the LTE radio technology, such as defined in 3GPP TS 36.201 V14.1.0 (2017 March). Like for example known for the SL mode of the LTE radio technology, D2D communication is also useful for implementing V2X (vehicle-to-anything) communications, which may for example include: V2V (vehicle-to-vehicle) communications between vehicles; V2P (vehicle-to-pedestrian) communications between a vehicle and a device carried by an individual, e.g., a handheld terminal carried by a pedestrian, cyclist, driver, or passenger; V2I (vehicle-to-infrastructure) communications between a vehicle and a roadside unit (RSU) of traffic infrastructure, e.g., an entity transmitting speed limit notifications, and V2N (vehicle-to-network) communications between a vehicle and a node of the wireless communication network.

By using the above-mentioned relay operation, it may for example be possible to provide network connectivity to the remote UE, even if the remote UE is outside direct network coverage. For example in a V2X scenario, one vehicle which is inside direct network coverage, could operate as a relay UE for another vehicle which is outside direct network coverage.

However, in V2X scenarios vehicles are typically moving with high velocity, with the effect a relay path via a certain relay UE may have a rather short life time. As a result, the remote UE may have to frequently switch between direct path and relay path or between different relay paths. This may in turn result in a high number of reconfigurations and/or service interruptions. Further, there may also be an increased higher risk of reconfiguration failure and/or traffic errors.

Accordingly, there is a need for techniques which allow for efficiently managing relaying of communication between a UE and a wireless communication network.

SUMMARY

According to an embodiment, a method of controlling communication in a wireless communication network is provided. According to the method, a radio device configures a group of further radio devices as candidate relay nodes for communication with the wireless communication network. Further, the radio device selects one or more of the further radio devices from the group as relay node for communication with the wireless communication network. Further, the radio device communicates with the wireless communication network via said one or more selected further radio devices.

According to a further embodiment, a method of controlling communication in a wireless communication network is provided. According to the method, a radio device receives first control information for assigning the radio device to of a group of radio devices configured as candidate relay nodes for communication of a further radio device with the wireless communication network. In response to the further radio device selecting the radio device as relay node for communication of the further radio device with the wireless communication network, the radio device relays communication between the further radio device and the wireless communication network.

According to a further embodiment, a method of controlling communication in a wireless communication network is provided. According to the method, a node of the wireless communication network configures a group of radio devices as candidate relay nodes for communication of a further radio device with the wireless communication network. Further; the node communicates with the further radio device via one or more radio devices selected as relay node from the group by the further radio device.

According to a further embodiment, a radio device for a wireless communication network is provided. The radio device is configured to configure a group of further radio devices as candidate relay nodes for communication with the wireless communication network. Further, the radio device is configured to select one or more of the further radio devices from the group as relay node for communication with the wireless communication network. Further, the radio device is configured to communicate with the wireless communication network via said one or more selected further radio devices.

According to a further embodiment, a radio device for a wireless communication network is provided. The radio device comprises at least one processor and a memory. The memory contains instructions executable by said at least one processor, whereby the radio device is operative to configure a group of further radio devices as candidate relay nodes for communication with the wireless communication network. Further, the memory contains instructions executable by said at least one processor, whereby the radio device is operative to select one or more of the further radio devices from the group as relay node for communication with the wireless communication network. Further, the memory contains instructions executable by said at least one processor, whereby the radio device is operative to communicate with the wireless communication network via said one or more selected further radio devices.

According to a further embodiment, a radio device for a wireless communication network is provided. The radio device is configured to receive first control information for assigning the radio device to of a group of radio devices configured as candidate relay nodes for communication of a further radio device with the wireless communication network. Further, the radio device is configured to, in response to the further radio device selecting the radio device as relay node for communication of the further radio device with the wireless communication network, relay communication between the further radio device and the wireless communication network.

According to a further embodiment, a radio device for a wireless communication network is provided. The radio device comprises at least one processor and a memory containing instructions executable by said at least one processor, whereby the radio device is operative to receive first control information for assigning the radio device to of a group of radio devices configured as candidate relay nodes for communication of a further radio device with the wireless communication network. Further, the memory contains instructions executable by said at least one processor, whereby the radio device is operative to, in response to the further radio device selecting the radio device as relay node for communication of the further radio device with the wireless communication network, relay communication between the further radio device and the wireless communication network.

According to a further embodiment, a node for a wireless communication network is provided. The node is configured to configure a group of radio devices as candidate relay nodes for communication of a further radio device with the wireless communication network. Further, the node is configured to communicate with the further radio device via one or more radio devices selected as relay node from the group by the further radio device.

According to a further embodiment, a node for a wireless communication network is provided. The node comprises at least one processor and a memory containing instructions executable by said at least one processor, whereby the node is operative to configure a group of radio devices as candidate relay nodes for communication of a further radio device with the wireless communication network. Further, the memory contains instructions executable by said at least one processor, whereby the node is operative to communicate with the further radio device via one or more radio devices selected as relay node from the group by the further radio device.

According to a further embodiment, a system is provided. The system comprises a radio device and a plurality of further radio devices. The radio device is configured to: configure a group of the further radio devices as candidate relay nodes for communication with the wireless communication network; select one or more of the further radio devices as relay node for communication with the wireless communication network; and communicate with the wireless communication network via said one or more selected further radio devices. The further radio devices are configured to: in response to the radio device selecting the further radio device as relay node for communication of the radio device with the wireless communication network, relay communication between the radio device and the wireless communication network. The system may further comprise a node of the wireless communication network. The node may be configured to control configuration of the group of the further radio devices.

According to a further embodiment of the invention, a computer program or computer program product is provided, e.g., in the form of a non-transitory storage medium, which comprises program code to be executed by at least one processor of a radio device for a wireless communication network. Execution of the program code causes the radio device to configure a group of further radio devices as candidate relay nodes for communication with the wireless communication network. Further, execution of the program code causes the radio device to select one or more of the further radio devices from the group as relay node for communication with the wireless communication network. Further, execution of the program code causes the radio device to communicate with the wireless communication network via said one or more selected further radio devices.

According to a further embodiment of the invention, a computer program or computer program product is provided, e.g., in the form of a non-transitory storage medium, which comprises program code to be executed by at least one processor of a radio device for a wireless communication network. Execution of the program code causes the radio device to receive first control information for assigning the radio device to of a group of radio devices configured as candidate relay nodes for communication of a further radio device with the wireless communication network. Further, execution of the program code causes the radio device to, in response to the further radio device selecting the radio device as relay node for communication of the further radio device with the wireless communication network, relay communication between the further radio device and the wireless communication network.

According to a further embodiment of the invention, a computer program or computer program product is provided, e.g., in the form of a non-transitory storage medium, which comprises program code to be executed by at least one processor of a node for a wireless communication network. Execution of the program code causes the node to configure a group of radio devices as candidate relay nodes for communication of a further radio device with the wireless communication network. Further, execution of the program code causes the node to communicate with the further radio device via one or more radio devices selected as relay node from the group by the further radio device.

Details of such embodiments and further embodiments will be apparent from the following detailed description of embodiments.

DETAILED DESCRIPTION OF EMBODIMENTS

Figure 1:
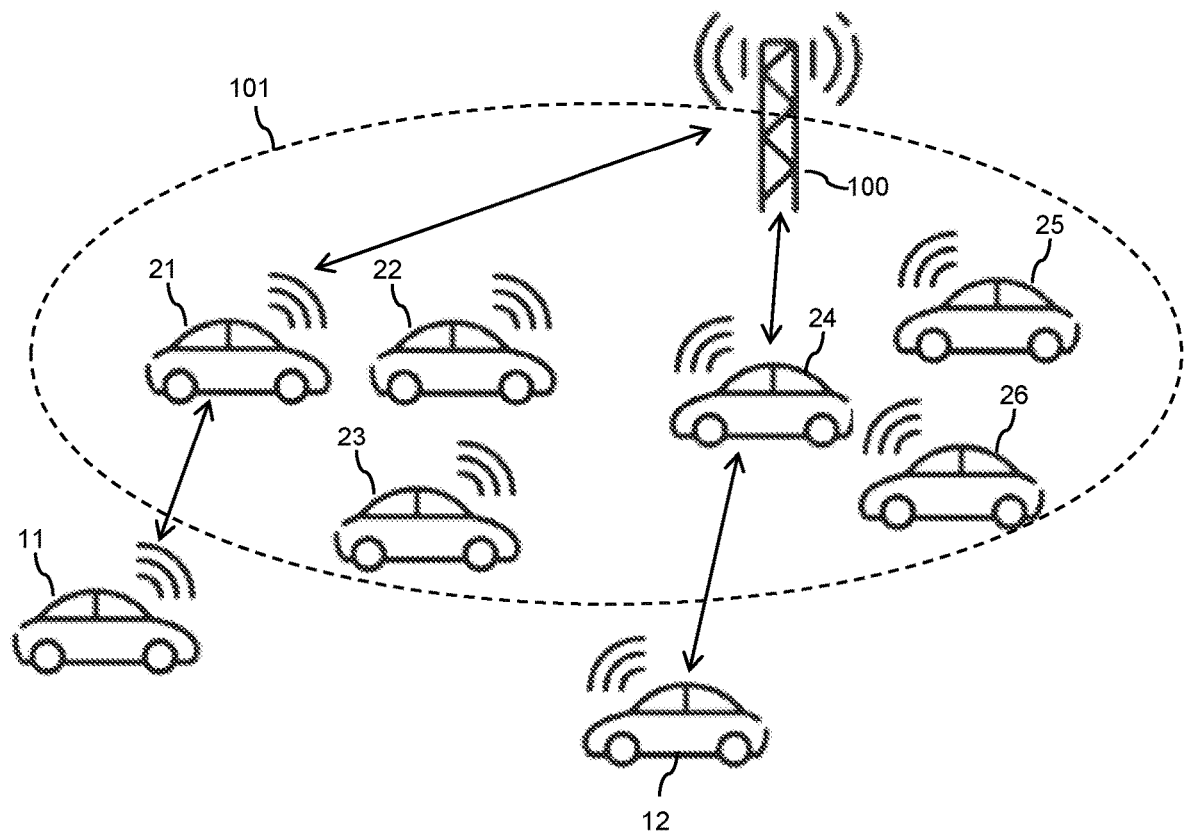
FIG. 1 shows an exemplary scenario for illustrating group-based relaying of communication in a wireless communication network according to an embodiment of the invention.

In the following, concepts in accordance with exemplary embodiments of the invention will be explained in more detail and with reference to the accompanying drawings. The illustrated embodiments relate to controlling communications in a wireless communication network. In the illustrated examples, it is assumed that the wireless communication network is based on the LTE radio technology or the NR radio technology, without limiting the applicability to those technologies.

In the illustrated concepts, communication of a first UE (user equipment) with the wireless communication network is assisted by one or more second UEs acting as relay nodes. The first UE will in the following also be referred to as remote UE. The one or more second UEs will in the following also be referred to as relay UEs. Accordingly, the communication may occurs via a relay link extending from the remote UE via one or more relay UEs to one or more nodes of the wireless communication network.

In the illustrated concepts, the remote UE selects the relay UE(s) from a group of candidate relay UEs. Accordingly, the selection of the utilized relay UE(s) may be accomplished in an autonomous manner by the remote UE. Further, the selection of the utilized relay UE(s) may be accomplished in a manner which is transparent to the wireless communication network. That is to say, it is not necessary that the wireless communication network is informed about the selected relay UE(s). Accordingly, on the network side a configuration or re-configuration of the relay link may only be needed when the UE switches between the relay link and a direct link to a node of the wireless communication network, or when the remote UE moves from one group of candidate relay UEs to another group of candidate relay UEs. Due to this transparency, higher protocol layers or core network functions of the wireless communication network may remain unaware of which relay UE(s) are actually utilized forwarding traffic between the remote UE and the wireless communication network.

For UL communication from the remote UE to the wireless communication network, the remote UE may send its traffic to all the candidate relay UEs of the group, while only the actually selected relay UE(s) will decode and forward the traffic to the wireless communication network.

For DL communication from the wireless communication network to the remote UE, one or more nodes of the wireless communication network may send traffic targeted for the remote UE traffic to all the candidate relay UEs of the group, while only the actually selected relay UE(s) will decode and forward the traffic to the remote UE.

The group may be configured or re-configured by a node of the wireless communication network and/or by the remote UE itself. The group may be configured on the basis of various criteria, including for example: location of the remote UE, location of the candidate UE, velocity of the remote UE, velocity of the candidate relay UE, signal quality between the remote UE and the candidate relay UE, etc. The group may be configured in a manner which is location specific, e.g., substantially depending on the locations and movement characteristics of candidate relay UEs. Further, the group may be configured in a manner which is specific to the remote UE, e.g., substantially depends on the locations and movement characteristics of both the remote UE and the candidate relay UEs.

FIG. 1 illustrates an exemplary scenario involving relay based communication. More specifically, FIG. 1 shows an access node 100 of the wireless communication network, in the LTE radio technology referred to as eNB, and various UEs 11, 12, 21, 22, 23, 24, 25, 26. In FIG. 1, a coverage area, or cell, of the access node 100 is schematically illustrated by 101. The coverage area 101 may be defined by a radio coverage area in which direct DL radio transmissions from the access node 100 and direct UL radio transmissions to the access node 100 are possible. Here, it is noted that the wireless communication network may of course also comprise further access nodes, each having a corresponding service area which may be overlapping or non-overlapping with the coverage area 101 of the access node 100.

Communication of the UEs 11, 12, 21, 22, 23, 24, 25, 26 with the access node 100 may be performed via a direct path or via a relay path. In this way, connectivity may also be provided to those UEs which are located outside the coverage area of the access node 100, like illustrated for the UEs 11, 12. In the illustrated example, it is assumed that the UEs 21, 22, 23, 24, 25, 26 each communicate via a direct path with the access node 100. The UEs 11, 12 in turn each communicate via a relay path with the access node 100. In the case of the UE 11, the relay path extends via a first group of candidate relay UEs, which includes the UEs 21, 22, 23. In the case of the UE 12, the relay path extends via a second group of candidate relay UEs, which includes the UEs 24, 25, 26. The UEs 11, 12 will in the following therefore also be referred to as remote UEs 11, 12, and the UEs 21, 22, 23, 24, 25, 26 will be referred to as candidate relay UEs 21, 22, 23, 24, 25, 26. The relay path or relay link may include a first portion between the remote UE 11, 12 and the respective candidate relay UEs 21, 22, 23, 24, 25, 26. When using the LTE radio technology, the first portion may be based on the PC5 SL interface of the LTE radio technology. A second portion of the relay path or relay link may extend between the candidate relay UEs 21, 22, 23, 24, 25, 26 and the access node 100 and, when using the LTE radio technology, be based on the Uu interface LTE radio technology.

In the example of FIG. 1, the UEs 11, 12, 21, 22, 23, 24, 25, 26 are assumed to be vehicles or vehicle-based UEs. The UEs 11, 12, 21, 22, 23, 24, 25, 26 may support various kinds of V2X communication, e.g., based on transmission of a cooperative awareness message (CAM) or a decentralized environmental notification message (DENM). However, it is noted that the entities shown in FIG. 1 are merely exemplary and other types of UE could be used in alternative or in addition, such as a mobile phone carried by a person, various types of portable or stationary computers, or wearable devices, such as a wristband device.

The above utilization of the group of candidate relay UEs 21, 22, 23, 24, 25, 26 for communication of a remote UE 11, 12 with the wireless communication network may involve configuration of a context of the relay connection at the remote UE 11, 12, at the candidate relay UEs 21, 22, 23, 24, 25, 26, and at one or more nodes of the wireless communication network, e.g., in an access node like the above-mentioned access node 100 or in a core network node.

A part of the context of the relay connection maintained at the network side, e.g., by the access node 100, may include the following information: the identifier of the group, individual identifiers of the candidate relay UEs 21, 22, 23, 24, 25, 26, e.g., in terms of a UE identity as used in the LTE Uu interface, and an identity of the remote UE 11, 12, e.g., in terms of a UE identity as used in the LTE Uu interface.

A part of the context of the relay connection maintained at the candidate relay UEs 21, 22, 23, 24, 25, 26 may include the following information: the identifier of the group to which the candidate relay UE 21, 22, 23, 24, 25, 26 is assigned and the identity of the remote UE 11, 12. The information on the identity of the remote UE may include an SL identity for identifying the remote UE 11, 12 on an SL link between the remote UE 11, 12 and the candidate relay UE 21, 22, 23, 24, 25, 26, such as a UE identity used on the LTE PC5 interface. Further, the information on the identity of the remote UE 11, 12 may include an identity of the remote UE 11, 12 as used on a direct link from the access node 100, a UE identity as used in the LTE Uu interface.

A part of the context of the relay connection maintained at the remote UE 11, 12 may include the identifier of the group of candidate relay UEs 21, 22, 23, 24, 25, 26 and/or the individual identities of the candidate relay UEs 21, 22, 23, 24, 25, 26 of the group, such as UE identities used on the LTE PC5 interface. Further the context information maintained at the remote UE 11, 12 may include the identity of the candidate relay UE(s) 21, 22, 23, 24, 25, 26 actually selected by the remote UE 11, 12 as relay node, e.g., in terms of an identity as used on the SL link between the remote UE 11, 12 and the selected candidate relay UE 21, 22, 23, 24, 25, 26, such as a UE identity used on the LTE PC5 interface.

As already mentioned above, the configuration of the group of candidate relay UEs 21, 22, 23, 24, 25, 26 may be based on various principles and criteria. According to some variants, the group of candidate relay UEs 21, 22, 23, 24, 25, 26 may be performed on the network side, in a manner which is specific to the characteristics of the potential candidate relay UEs 21, 22, 23, 24, 25, 26, but not specific to characteristics of a particular remote UE 11, 12. In this case, a relay capable UE within coverage of the wireless communication network can be assigned to the group by a node of the wireless communication network, such as the access node 100. This may involve indicating an identifier of the group to the candidate relay UE 21, 22, 23, 24, 25, 26. The assignment may be static or semi-static, e.g., valid for a certain time or until revocation. The assignment may be accomplished by signaling which is dedicated to the UE 21, 22, 23, 24, 25, 26, e.g., during the connection establishment procedure. Alternatively or in addition, assignment may be accomplished by common signaling shared by multiple UEs, e.g., via system information. In some cases, the assignment could be random. In an extreme case all relay capable UEs in the same coverage area could be assigned to the same group of candidate relay UEs.

Figure 2:
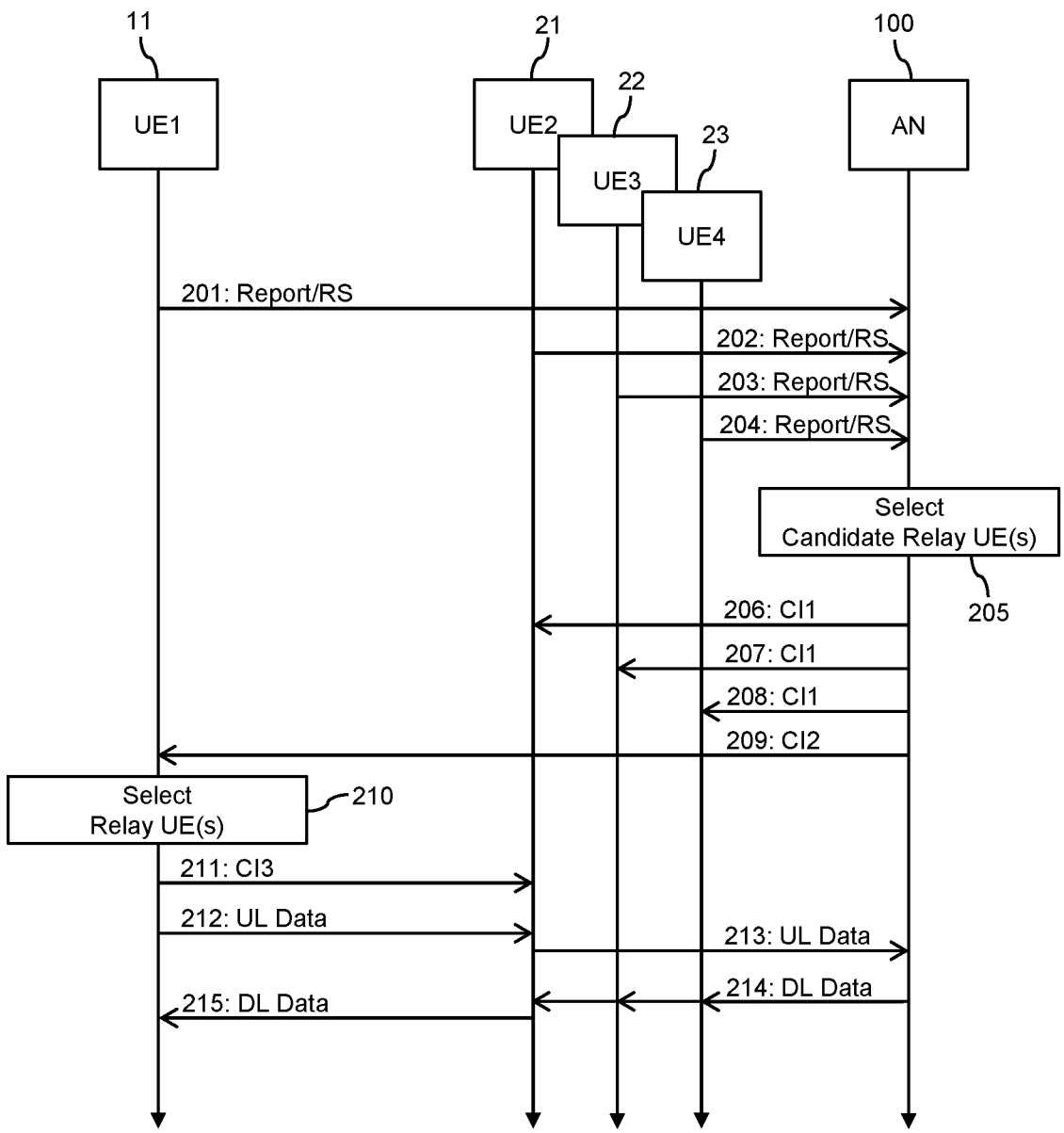
FIG. 2 illustrates an example of processes involving relaying of communication according to an embodiment of the invention.

At the candidate relay UE 21, 22, 23, 24, 25, 26, the identity of the group may be maintained in a relay group context, which may be modified in response to the candidate relay UE 21, 22, 23, 24, 25, 26 being assigned to another group or being removed from the group. At the network side, information of the assignment of candidate relay UEs to the group may be stored in a relay group context, which may be modified in response to the candidate relay UEs 21, 22, 23, 24, 25, 26 entering or leaving active mode or moving to another coverage area. In addition, the configuration of the group can be based on geographical location information. For instance, the coverage area of an access could be split into several smaller zones and relay capable UEs within the same zone may be assigned to the same group. For this purpose, the relay capable UEs may report their location to the wireless communication network, and the assignment of candidate relay UEs 21, 22, 23, 24, 25, 26 to the groups may be based on the reported information, e.g., like in the example of FIG. 2 illustrated below. Alternatively the relay capable UEs could be configured with information about the zones and, when entering a certain zone, autonomously select the group corresponding to the zone and inform the wireless communication network accordingly when entering active mode. When using such zones, the relay group context may be reconfigured at the candidate relay UEs 21, 22, 23, 24, 25, 26 when being configured with new information about the zones or when moving to a different zone. At the network side, the relay group context may be reconfigured when one or more candidate relay UEs 21, 22, 23, 24, 25, 26 enter or leave active mode or move to another zone.

According to some variants, the group of candidate relay UEs 21, 22, 23, 24, 25, 26 may be configured in a manner which is specific to the remote UE 11, 12 using the group of candidate relay UEs 21, 22, 23, 24, 25, 26. In this case, the relay group may be configured with the aim of including only candidate relay UEs 21, 22, 23, 24, 25, 26 located or moving in the vicinity of the remote UE 11, 12. In this case, different remote UEs 21, 22, 23, 24, 25, 26 operating in relation to the same coverage area, such as the remote UEs 11, 12 in the example of FIG. 1, may be configured with a different group of candidate relay nodes, e.g. a different identity of the relay group. Here it is noted that these different groups may at least partly overlap, i.e., include one or more candidate relay UEs 21, 22, 23, 24, 25, 26 which are also included in the other group.

The remote UE specific configuration of the group of candidate relay UEs 21, 22, 23, 24, 25, 26 may be based on information reported by the remote UE, such as strength and/or quality of an SL reference signal from the candidate relay UE 21, 22, 23, 24, 25, 26, identity of the relay UE 21, 22, 23, 24, 25, 26, and identity of a serving node of the candidate relay UEs, e.g., as obtained from a discovery message, location information or velocity information from a CAM transmitted by the candidate relay UE 21, 22, 23, 24, 25, 26. Further, the UE specific configuration may consider information reported by the candidate relay UE 21, 22, 23, 24, 25, 26, e.g., strength and/or quality of a reference signal from the node serving the candidate relay UE, CAM location and/or CAM velocity. After the determining the group based on such dynamically varying criteria, the relay group context at the network side may be updated and the relevant candidate relay UEs 21, 22, 23, 24, 25, 26 informed to update the relay group context accordingly. The wireless communication network may also request the candidate relay UEs 21, 22, 23, 24, 25, 26 to enter active mode if they are currently in idle or inactive mode. The relay group context at the remote UE 11, 12 may then be updated as well, e.g., based on control information provided directly by a node of the wireless communication network, e.g., by the access node 100 like in the example of FIG. 2 illustrated below, or provided indirectly via the candidate relay UEs.

Figure 3:
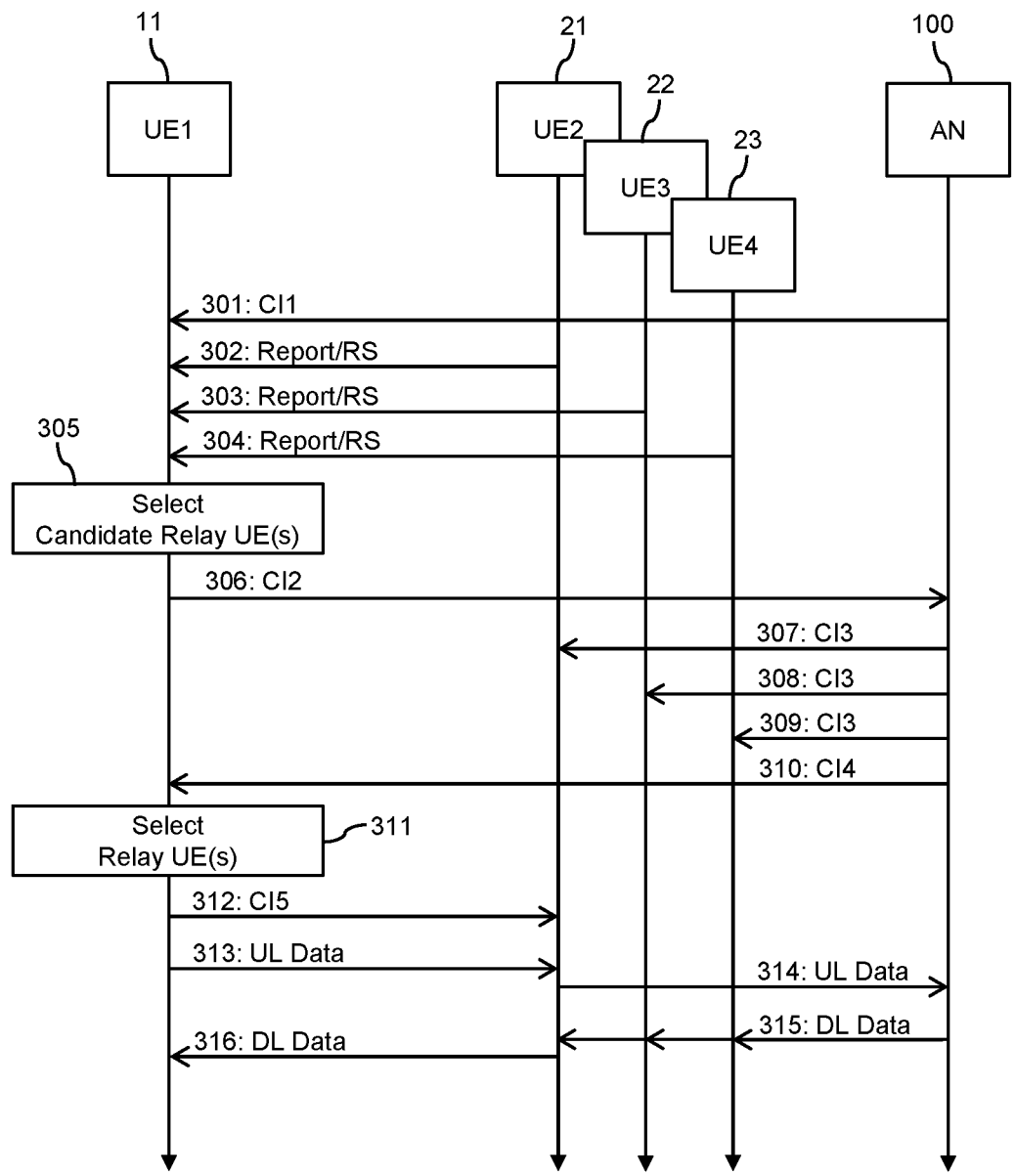
FIG. 3 illustrates a further example of processes involving relaying of communication according to an embodiment of the invention.

In some variants, the group of candidate relay UEs 21, 22, 23, 24, 25, 26 may be determined by the remote UE 11, 12 itself, e.g., like in the example of FIG. 3 illustrated below. The wireless communication network may provide some determination criteria via dedicated signaling or common signaling, such as the maximum allowed distance and/or the lowest allowed signal quality between a group member and the corresponding remote UE, the maximum allowed (relative) speed of a group member and the corresponding remote UE, the maximum number of allowed relay UEs in a relay group, or the like. For example, in the example of FIG. 3 the first control information 301 could be used to provide such determination criteria. The remote UE 11, 12 may then inform the wireless communication network about the configured group of candidate relay UEs 21, 22, 23, 24, 25, 26. In response, the wireless communication network may update the relay group context and inform the candidate relay UEs 21, 22, 23, 24, 25, 26 and the remote UE 11, 12 to update the relay group context accordingly. The wireless communication network may request the candidate relay UEs 21, 22, 23, 24, 25, 26 to enter active mode if they are currently in idle or inactive mode.

In each case the group of candidate relay UEs 21, 22, 23, 24, 25, 26 may be reconfigured if one or more candidate relay UEs 21, 22, 23, 24, 25, 26 need to be added to or removed from a relay group, which may be caused by the movement of either the candidate relay UE(s) 21, 22, 23, 24, 25, 26 or the remote UE(s) 11, 12, or both.

Accordingly, in order to setup a relay link from the remote UE 11, 12 to the wireless communication network, initially the group of candidate relay UEs 21, 22, 23, 24, 25, 26 is configured, either by the wireless communication network, the remote UE 11, 12, or cooperation of the remote UE 11, 12 and the wireless communication network. As explained above, this may be accomplished in a manner which is specific to the remote UE or in a location-based manner, without being specific to the remote UE 11, 12. At this stage, a relay group context of the configured group is maintained both by the wireless communication network and by the candidate relay UEs 21, 22, 23, 24, 25, 26 of the group.

The candidate relay UEs may then announce the availability of the group of candidate relay UEs 21, 22, 23, 24, 25, 26 via the SL interface, so that the group can be discovered by the remote UE 11, 12. This may use existing SL discovery signaling, e.g., like specified in 3GPP TS 23.303 V15.1.0 (2018 June), or signaling dedicated for this purpose. In some cases, the remote UE 11, 12 may already be aware of the available group of candidate relay UEs 21, 22, 23, 24, 25, 26, e.g., because group was configured the remote UE 11, 12 or at least participated in the configuration of the group.

In response to the remote UE 11, 12 having discovered the group of candidate relay UEs 21, 22, 23, 24, 25, 26, it may be decided whether the remote UE 11, 12 should switch from a direct link or another relay link to a relay link based on the discovered the group of candidate relay UEs 21, 22, 23, 24, 25, 26. This decision may for example be performed at the network side, e.g., based on information reported by the remote UE 11, 12, such as strength and/or quality of a SL reference signal from one or more of the candidate relay UEs 21, 22, 23, 24, 25, 26, location information and/or velocity information from CAM, or the like. Alternatively this decision could be performed by the remote UE 11, 12 itself and then be reported to the wireless communication network.

In response to deciding to switch to the relay link, the relay group context at the remote UE 11, 12 may be updated to the new group of candidate relay UEs.

The remote UE 11, 12 may then autonomously select one or more relay UEs 21, 22, 23, 24, 25, 26 from the group to act as a relay node for its communication with the wireless communication network. The remote UE 11, 12 may indicate the selection result to the candidate relay UEs 21, 22, 23, 24, 25, 26 in the group either by explicit signaling or implicitly by setting up an SL connection with the selected candidate relay UE(s) 21, 22, 23, 24, 25, 26. At the selected candidate relay UEs 21, 22, 23, 24, 25, 26, context information is updated to indicate that the remote UE 11, 12 is served via the selected candidate UE 21, 22, 23, 24, 25, 26. Also at the remote UE 11, 12, context information is updated to indicate that the remote is served via the selected candidate UE(s) 21, 22, 23, 24, 25, 26.

A reconfiguration of the group of candidate relay UEs 21, 22, 23, 24, 25, 26 may be triggered if some candidate relay UEs 21, 22, 23, 24, 25, 26 need to be added into or removed from the group. For example, this may be due to the movement of the candidate relay UEs 21, 22, 23, 24, 25, 26. If the group of candidate relay UEs 21, 22, 23, 24, 25, 26 is configured in a manner which is specific to the remote UE 11, 12, a need to add or remove candidate relay UEs 21, 22, 23, 24, 25, 26 may also be caused by the movement of one or more candidate relay UEs 21, 22, 23, 24, 25, 26 and the remote UE 11, 12 relative to each other. Such reconfiguration may be reflected by updates of the parts of the context of the relay connection maintained by the remote UE 11, 12 and the candidate relay UEs 21, 22, 23, 24, 25, 26.

The part of the context of the relay connection at the network side may need to be modified only if when the remote UE 11, 12 leaves the current group. For example, the remote UE 11, 12 may discover a candidate relay UE 21, 22, 23, 24, 25, 26 which is not part of the currently used group. The discovered candidate relay UE 21, 22, 23, 24, 25, 26 not being part of the current group can for example be detected based on a discovery message transmitted by the discovered candidate relay UE 21, 22, 23, 24, 25, 26 indicating a relay group identifier which is different from the current group. When the remote UE 11, 12 nonetheless switches to the newly discovered candidate relay UE 21, 22, 23, 24, 25, 26, the context information indicating the identity of the group may need to be updated also at the network side.

FIG. 2 shows an example of processes in which relay based communication is controlled based on the principles as outlined above. The processes of FIG. 2 involve the remote UE 11, the candidate relay UEs 21, 22, 23, and the access node 100. However, it is noted that further UEs could be involved as well, such as the above-mentioned UEs 24, 25, 26.

In the example of FIG. 2, the UE 11 transmits a report and/or reference signal (RS) 201, which is received by the access node 100. Based on the report and/or RS 201, the access node 100 may determine various information on the UE 11, such as location, velocity, direction of movement, signal quality between the UE 11 and the access node 100, or signal quality between the UE 11 and other UEs, such as the UEs 21, 22, 23.

In the illustrated example, also the UE 21 transmits a report and/or RS 202, which is received by the access node 100. Based on the report and/or RS 202, the access node 100 may determine various information on the UE 21, such as location, velocity, direction of movement, signal quality between the UE 21 and the access node 100, or signal quality between the UE 21 and other UEs, such as the UEs 11, 22, 23. Similarly, also the UE 22 transmits a report and/or RS 203, which is received by the access node 100. Based on the report and/or RS 203, the access node 100 may determine various information on the UE 22, such as location, velocity, direction of movement, signal quality between the UE 22 and the access node 100, or signal quality between the UE 22 and other UEs, such as the UEs 11, 21, 23. Similarly, also the UE 23 transmits a report and/or RS 204, which is received by the access node 100. Based on the report and/or RS 204, the access node 100 may determine various information on the UE 23, such as location, velocity, direction of movement, signal quality between the UE 23 and the access node 100, or signal quality between the UE 23 and other UEs, such as the UEs 11, 21, 22. Similar information may also be collected for other UEs, such as the UEs 12, 24, 25, 26.

Based on the collected information, the access node 100 then selects a group of candidate relay UEs, as illustrated by block 205. In the illustrated example, it is assumed that the access node 100 selects the UEs 21, 22, 23 as candidate UEs. The access node 100 may determine the group in a location specific manner, e.g., by considering the relative locations and signal qualities determined for the UEs 21, 22, 23, but without tailoring the group to a specific remote UE, such as the UE 11. As a result, the group may then include candidate relay UEs which are located close to each other and move with similar velocity. However, the access node 100 could also determine the group in a manner which is specific with respect to a specific remote UE, such as the UE 11. In this case the determination may further consider the information on this specific remote UE. As a result, the group may then include candidate relay UEs which are also located close to the remote UE and move with similar velocity as the remote UE.

The access node 100 then provides first control information (CI) 206, 207, 208 to the candidate relay UEs 21, 22, 23 of the group. By the first CI 206, 207, 208, the candidate relay UEs 21, 22, 23 of the group are informed that they have been assigned to the group. The first CI 206, 207, 208 may also indicate an identifier of the group, e.g., in terms of a group RNTI (Radio Network Temporary Identity).

Further, the access node 100 provides second CI 209 to the UE 11. By means of the second CI 209, the UE 11 is informed about the group of candidate relay UEs 21, 22, 23 which is available for relay based communication of the UE 11. Also the second CI 209 may indicate an identifier of the group, e.g., in terms of a group RNTI.

As indicated by block 210, the UE 11 then selects one or more of the candidate relay UEs 21, 22, 23 from the group, to be used as relay nodes for communication of the UE 11 with the access node 100. The selection may be based on various kinds of information available at the UE 11, e.g., information from measurements on signals received from the candidate relay UEs 21, 22, 23 and/or information from reports provided by the candidate relay UEs 21, 22, 23. In the illustrated example, it is assumed that the UE 11 selects the UE 21 as relay node. Rules or criteria for performing the selection may be pre-configured by the wireless communication network, e.g., using dedicated or common signaling from the access node 100. Here, dedicated signaling may refer to signaling which is individually addressed to the UE 11, e.g., as used during connection establishment, while common signaling may refer to signaling which is addressed to multiple UEs, such as broadcasted system information.

In response to selecting the UE 21 as relay node, the UE 11 transmits third CI 211 to inform the group of candidate relay UEs 21, 22, 23 about the selection result of block 210. In the illustrated example, it is assumed that the UE 11 transmits the third CI only to the selected candidate relay UE 21. Based on not receiving similar control information, the other candidate relay UEs 22, 23 may then implicitly know that they were not selected. In some scenarios, the UE 11 may indicate the selection also by setting up a SL connection to the selected candidate relay UE 21. Based on the setup of the SL connection, the selected candidate UE may then implicitly know that it was selected, while the absence of the SL connection implicitly indicates to the other candidate relay UEs 22, 23 that they were not selected.

As further illustrated, the UE 11 may then communicate with the access node 100, using the selected candidate relay UE 21 as relay node. The communication of the UE 11 with the access node 100 may involve that the UE 11 sends UL data 212 to the UE 21, which are received and decoded by the UE 21, and then forwarded by the UE 21 to the access node 100, as indicated by 213.

Here, the UE 11 may send the UL data in a multicast message to all the candidate relay UEs of the group, e.g., by using a group SL identity of the group as destination identifier. Only the candidate relay UE(s) that were selected at block 210, in the illustrated example the UE 21, may then decode and forward the UL data 212. In case only one candidate relay UE is selected at block 210, like in the illustrated example, the UE 11 could however also send the UL data 212 in a unicast message to the selected candidate relay UE 21, e.g., using the an SL identity of the selected candidate relay UE 21 as destination identifier.

When the selected relay UE 21 sends the forwarded UL data 213, the forwarded UL data 213 may be scrambled using a group RNTI which is derived from the identity of the group of candidate relay nodes. In case only one candidate relay UE is selected at block 311, like in the illustrated example, a C-RNTI (cell RNTI) of the selected candidate relay UE 21 could be used for scrambling the forwarded UL data 213. Furthermore, when different relay group identities are configured for different groups of candidate relay UEs associated to different remote UEs, i.e., if there is a one to one mapping between relay group identity and the identities of the remote UEs, the identity of the remote UE 11 does not need to be included in the forwarded UL data 213.

Alternatively or in addition, the communication of the UE 11 with the access node 100 may involve that the access node 100 sends DL data 214 to the group of candidate relay UEs 21, 22, 23, e.g., addressed by the identifier of the group. The DL data 214 are then received and decoded by the UE 21 and forwarded to the UE 11, as indicated by 215. In response to not being selected by the UE 11, the UEs 22, 23 may ignore the DL data 214.

When the access node 100 sends the DL data 214, the DL data 214 may be scrambled using a group RNTI which is derived from the identity of the group of candidate relay UEs. Only the relay UE(s) that are selected at block 210 could then decode and forward the DL data 214. In case only one candidate relay UE is selected at block 210, like in the illustrated example, a C-RNTI of the selected candidate relay UE 21 could be used for scrambling the DL data 214. Furthermore, when different relay group identities are configured for different groups of candidate relay UEs associated to different remote UEs, i.e., if there is a one to one mapping between relay group identity and the identities of the remote UEs, the identity of the remote UE 11 does not need to be included in the DL data 214.

FIG. 3 shows a further example of processes in which relay based communication is controlled based on the principles as outlined above. The processes of FIG. 3 involve the remote UE 11, the candidate relay UEs 21, 22, 23, and the access node 100. However, it is noted that further UEs could be involved as well, such as the above-mentioned UEs 24, 25, 26.

In the example of FIG. 3, access node 100 may initially provide first control information (CI) 301 to the UE 11, e.g., using dedicated or common signaling from the access node 100. The first CI 301 may indicate one or more rules for configuration of a group of candidate relay UEs, e.g., in terms of threshold distances and/or threshold signal qualities. Here, dedicated signaling may refer to signaling which is individually addressed to the UE 11, e.g., as used during connection establishment, while common signaling may refer to signaling which is addressed to multiple UEs, such as broadcasted system information.

As further illustrated, in the example of FIG. 3 the UE 21 transmits a report and/or reference signal (RS) 302, which is received by the UE 11. Based on the report and/or RS 302, the UE 11 may determine various information on the UE 21, such as location, velocity, direction of movement, signal quality between the UE 21 and the access node 100, or signal quality between the UE 21 and other UEs, such as the UEs 11, 22, 23.

In the illustrated example, also the UE 22 transmits a report and/or RS 303, which is received by the UE 11. Based on the report and/or RS 303, the UE 11 may determine various information on the UE 22, such as location, velocity, direction of movement, signal quality between the UE 22 and the access node 100, or signal quality between the UE 22 and other UEs, such as the UEs 11, 21, 23. Similarly, also the UE 23 transmits a report and/or RS 304, which is received by the UE 11. Based on the report and/or RS 304, the UE 11 may determine various information on the UE 23, such as location, velocity, direction of movement, signal quality between the UE 23 and the access node 100, or signal quality between the UE 23 and other UEs, such as the UEs 11, 21, 22. In a similar manner, the UE 11 may also collect information for other UEs, such as the UEs 12, 24, 25, 26.

Based on the collected information, the UE 11 then selects a group of candidate relay UEs, as illustrated by block 305. In the illustrated example, it is assumed that the access node 100 selects the UEs 21, 22, 23 as candidate UEs. The UE 11 may determine the group in a location and remote UE specific manner, e.g., by considering the relative locations and signal qualities determined for the UEs 21, 22, 23. As a result, the group may then include candidate relay UEs which are located close to each other and move with similar velocity and which are also located close to the UE 11 and move with similar velocity as the UE 11.

The UE 11 then provides second CI 306 to the access node 100. By the second CI 306, the access node 100 is informed about the candidate relay UEs 21, 22, 23 assigned to the group. The access node then provides third CI 307, 308, 309 to the candidate relay UEs 21, 22, 23 of the group. By the third CI 307, 308, 309 the candidate relay UEs 21, 22, 23 of the group are informed that they have been assigned to the group. The third CI 307, 308, 309 may also indicate an identifier of the group, e.g., in terms of a group RNTI.

Further, the access node 100 provides fourth CI 310 to the UE 11. By means of the fourth CI 310, the UE 11 is informed about the group of candidate relay UEs 21, 22, 23 which is available for relay based communication of the UE 11. Also the fourth CI 310 may indicate an identifier of the group, e.g., in terms of a group RNTI.

As indicated by block 311, the UE 11 then selects one or more of the candidate relay UEs 21, 22, 23 from the group, to be used as relay nodes for communication of the UE 11 with the access node 100. The selection may be based on various kinds of information available at the UE 11, e.g., information from measurements on signals received from the candidate relay UEs 21, 22, 23 and/or information from reports provided by the candidate relay UEs 21, 22, 23. In the illustrated example, it is assumed that the UE 11 selects the UE 21 as relay node. Rules or criteria for performing the selection may be pre-configured by the wireless communication network, e.g., using dedicated or common signaling from the access node 100. Here, dedicated signaling may refer to signaling which is individually addressed to the UE 11, e.g., as used during connection establishment, while common signaling may refer to signaling which is addressed to multiple UEs, such as broadcasted system information.

In response to selecting the UE 21 as relay node, the UE 11 transmits fifth CI 312 to inform the group of candidate relay UEs 21, 22, 23 about the selection result of block 310. In the illustrated example, it is assumed that the UE 11 transmits the fifth CI 312 only to the selected candidate relay UE 21. Based on not receiving similar control information, the other candidate relay UEs 22, 23 may then implicitly know that they were not selected. In some scenarios, the UE 11 may indicate the selection also by setting up a SL connection to the selected candidate relay UE 21. Based on the setup of the SL connection, the selected candidate UE may then implicitly know that it was selected, while the absence of the SL connection implicitly indicates to the other candidate relay UEs 22, 23 that they were not selected.

As further illustrated, the UE 11 may then communicate with the access node 100, using the selected candidate relay UE 21 as relay node. The communication of the UE 11 with the access node 100 may involve that the UE 11 sends UL data 313 to the UE 21, which are received and decoded by the UE 21, and then forwarded by the UE 21 to the access node 100, as indicated by 314. Here, the UE 11 may send the UL data in a multicast message to all the candidate relay UEs of the group, e.g., by using a group SL identity of the group as destination identifier. Only the candidate relay UE(s) that were selected at block 311, in the illustrated example the UE 21, could then decode and forward the UL data 313. In case only one candidate relay UE is selected at block 311, like in the illustrated example, the UE 11 could however also send the UL data 313 in a unicast message to the selected candidate relay UE 21, e.g., using the an SL identity of the selected candidate relay UE 21 as destination identifier.

When the selected relay UE sends the forwarded UL data 314, the forwarded UL data 314 may be scrambled using a group RNTI which is derived from the identity of the group of candidate relay nodes. In case only one candidate relay UE is selected at block 311, like in the illustrated example, a C-RNTI of the selected candidate relay UE 21 could be used for scrambling the forwarded UL data 314. Furthermore, when different relay group identities are configured for different groups of candidate relay UEs associated to different remote UEs, i.e., if there is a one to one mapping between relay group identity and the identities of the remote UEs, the identity of the remote UE 11 does not need to be included in the forwarded UL data 314.

Alternatively or in addition, the communication of the UE 11 with the access node 100 may involve that the access node 100 sends DL data 315 to the group of candidate relay UEs 21, 22, 23, e.g., addressed by the identifier of the group. The DL data 315 are then received and decoded by the UE 21 and forwarded to the UE 11, as indicated by 316. In response to not being selected by the UE 11, the UEs 22, 23 may ignore the DL data 315.

When the access node 100 sends the DL data 315, the DL data may be scrambled using a group RNTI which is derived from the identity of the group of candidate relay UEs. Only the relay UE(s) that are selected at block 311 may then decode and forward the DL data 315. In case only one candidate relay UE is selected at block 311, like in the illustrated example, a C-RNTI of the selected candidate relay UE could be used for scrambling the DL data 315. Furthermore, when different relay group identities are configured for different groups of candidate relay UEs associated to different remote UEs, i.e., if there is a one to one mapping between relay group identity and the identities of the remote UEs, the identity of the remote UE 11 does not need to be included in the DL data 315.

It is noted that at least a part of the processes of FIGS. 2 and 3 could be iterated. In particular, the remote UE 11 could repeatedly perform the selection of block 210 or 311 to thereby newly select one or more other candidate relay UEs from the group. Such new selection may be performed in a manner which is transparent to the access node 100 or other nodes of the wireless communication network. A reconfiguration on the network side may be limited to the case that the UE 11 moves to another group of candidate relay UEs or the case that the UE 11 switches from the relay link to a direct link to the access node 100. Further, also the configuration if the group at block 205 or 305 could be iterated, e.g., in response to a candidate relay UE moving away from the other candidate relay UEs of the group or a potential new candidate relay UE moving towards the candidate relay UEs of the group.

Still further, it is noted that the principles explained in connection with the processes of FIGS. 2 and 3 are not mutually exclusive. In particular, the network based determination of the group of candidate relay UEs of the example of FIG. 2 could be combined with the UE based determination of the group of the example of FIG. 3. For example, the group could be first determined on the network side, using processes as explained in connection with FIG. 2, and then further candidate relay UEs could be added by the remote UE and/or candidate relay UEs removed from the group, using processes as explained in connection with FIG. 3.

Moreover, it is to be noted that from the perspective of higher communication layers or the core network, the transmission from/to the remote UE could be still in unicast manner even if multiple relay UEs are actually used to forward the traffic, because the higher communication layers may be left unaware of which relay UE(s) are actually used for relaying the remote UE's traffic.

Figure 4:
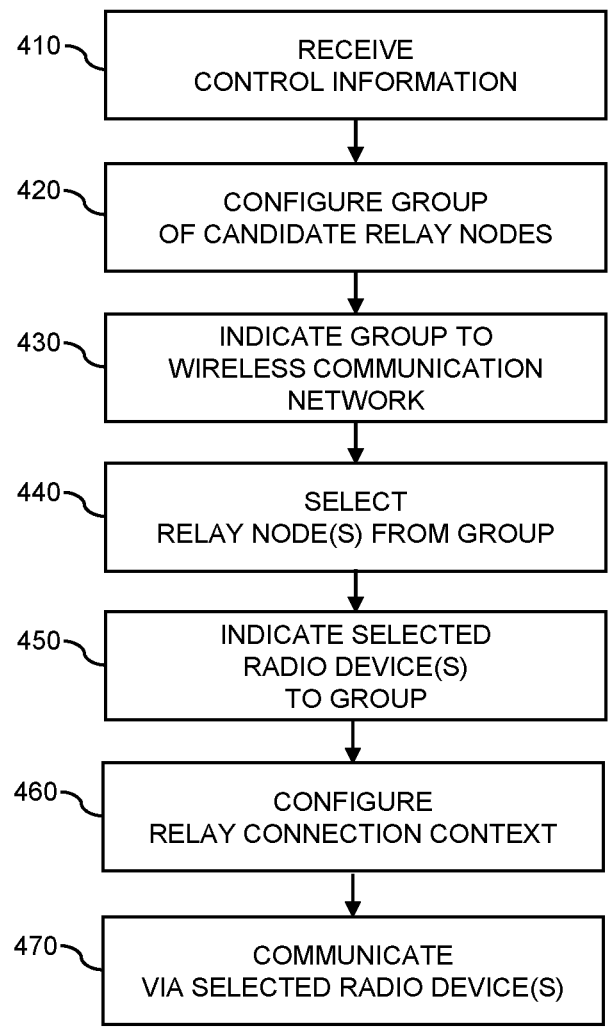
FIG. 4 shows an exemplary flowchart for schematically illustrating a method according to an embodiment of the invention, which may be implemented by a radio device using a group-based relay link.

FIG. 4 shows a flowchart for illustrating a method of controlling communication in a wireless communication network. The method of FIG. 4 may be utilized for implementing the illustrated concepts in a radio device which receives uses a group-based relay link for communication with the wireless communication network. For example, the radio device could correspond to the above-mentioned remote UE 11 or 12.

If a processor-based implementation of the radio device is used, at least some of the steps of the method of FIG. 4 may be performed and/or controlled by one or more processors of the radio device. Such radio device may also include a memory storing program code for implementing at least some of the below described functionalities or steps of the method of FIG. 4.

At step 410, the radio device may receive first control information from the wireless communication network. The radio device may receive the first control information in signaling dedicated to the radio device, e.g., in a unicast control message. Alternatively or in addition, the radio device may receive the first control information in common signaling to multiple radio devices, e.g., in a multicast or broadcast control message, such as broadcasted system information.

At step 420, the radio device may configure a group of further radio devices as candidate relay nodes for communication with the wireless communication network. This configuration may be based on the control information received at step 410. Alternatively or in addition, this configuration may be based on other information available at the radio device, e.g., on one or more reports received by the radio device or on one or more measurements performed by the radio device. The group may be identified by a group identifier.

In some scenarios, the radio device may configure the group based on at least one of: distance between the radio device and the respective further radio device, relative velocity of the radio device and the respective further radio device, and quality of a signal transmitted between the radio device and the respective further radio device. This information can be measured by the radio device and/or reported to the radio device.

At step 430, the radio device may indicate the configured group to the wireless communication network. This may for example involve sending corresponding control information to the wireless communication network. Here, it is noted that for example if the configuration of the group is completely based on control information from the wireless communication network received at step 410, indicating the configured group to the wireless communication network might not be needed.

At step 440, the radio device selects one or more of the further radio devices from the group as relay node for communication with the wireless communication network. This selecting of the one or more further radio devices may be based on at least one of: distance between the radio device and the respective further radio device, relative velocity of the radio device and the respective further radio device, and quality of a signal transmitted between the radio device and the respective further radio device. This information can be measured by the radio device and/or reported to the radio device.

At step 450, the radio device may indicate the selected one or more further radio devices to the group of further radio devices. For example, this may involve that the radio device sends second control information indicating the selected one or more further radio devices to the group of further radio devices. Alternatively or in addition, the radio device may indicate the selected one or more further radio devices to the group by setting up a D2D communication link to the one or more further selected radio devices.

At step 460, the radio device may configure a context of a relay link for said communicating with the wireless communication network via said one or more selected further radio devices. A part of the context may be maintained at the radio device, a further part at the further radio devices, and a still further part at the wireless communication network. Information on the one or more further radio devices selected at step 440, i.e., the result of selection, may be confined to parts of the context maintained by the radio device and the further radio devices.

At step 470, the radio device communicates with the wireless communication network via said one or more selected further radio devices. This may comprise sending at least one message, i.e., UL communication of data, and/or receiving at least one message, i.e., DL communication of data.

In some scenarios, if the group configured at step 420 is identified by a group identifier, step 470 may involve that the radio device sends at least one message via the selected one or more further radio devices to the wireless communication network and addresses the at least one message by the group identifier to the selected one or more further radio devices.

In some scenarios, the radio device may newly select one or more of the further radio devices from the group as relay node for said communication with the wireless communication network, e.g., due to movement of the radio device and/or of the further radio device. In this case, if information on the one or more further radio devices selected at step 440, i.e., the result of selection, is confined to parts of the context maintained by the radio device and the further radio devices as mentioned in connection with step 460, the radio device may continue the communication with the wireless communication network via said one or more newly selected further radio devices, without modification of a part of the context maintained at the wireless communication network.

Figure 5:
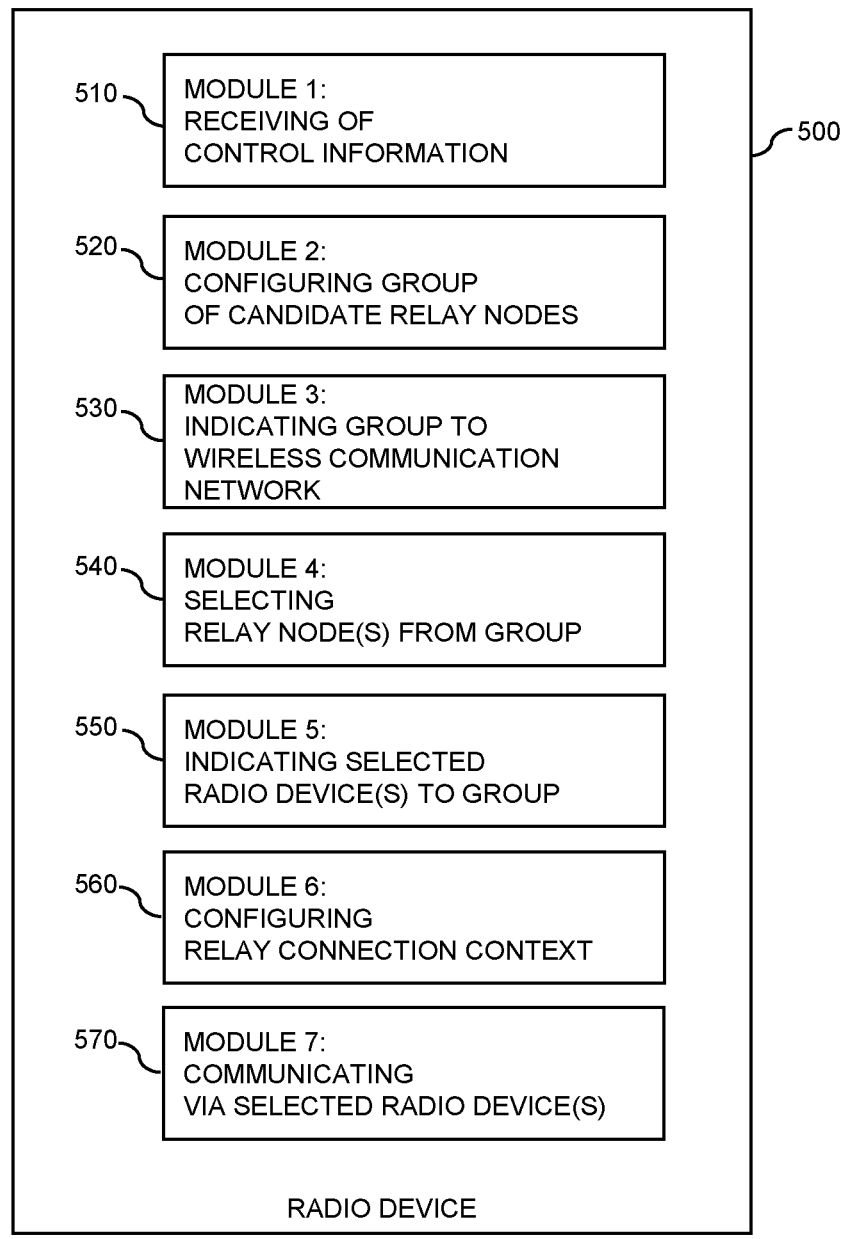
FIG. 5 shows an exemplary block diagram for illustrating functionalities of a radio device implementing functionalities corresponding to the method of FIG. 4.

FIG. 5 shows a block diagram for illustrating functionalities of a radio device 500 which operates according to the method of FIG. 4. The radio device 500 may for example correspond to one of the above-mentioned remote UEs 11, 12. As illustrated, the radio device 500 may optionally be provided with a module 510 configured to receive first control information, such as explained in connection with step 410. Further, the radio device 500 may be provided with a module 520 configured to configure a group of further radio devices as candidate relay nodes, such as explained in connection with step 420. Further, the radio device 500 may optionally be provided with a module 530 configured to indicate the configured group to the wireless communication network, such as explained in connection with step 430. Further, the radio device 500 may be provided with a module 540 configured to select one or more further radio devices from the group as relay nodes, such as explained in connection with step 440. Further, the radio device 500 may optionally be provided with a module 550 configured to indicate the selected further radio devices to the group of further radio devices, such as explained in connection with step 450. Further, the radio device 500 may optionally be provided with a module 560 configured to configure a context of a relay link, such as explained in connection with step 460. Further, the radio device 500 may be provided with a module 570 configured to communicate via the selected further radio devices with the wireless communication network, such as explained in connection with step 470.

It is noted that the radio device 500 may include further modules for implementing other functionalities, such as known functionalities of a UE supporting V2X or other types of SL communication. Further, it is noted that the modules of the radio device 500 do not necessarily represent a hardware structure of the radio device 500, but may also correspond to functional elements, e.g., implemented by hardware, software, or a combination thereof.

Figure 6:
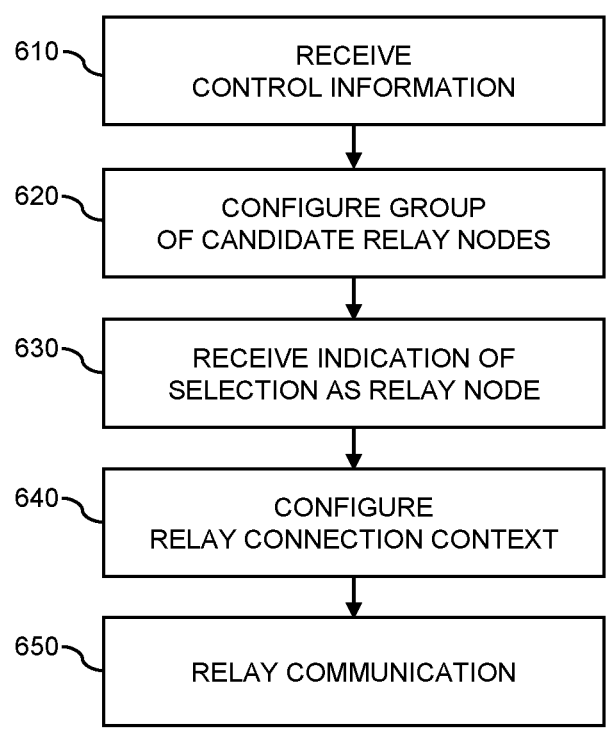
FIG. 6 shows an exemplary flowchart for schematically illustrating a method according to an embodiment of the invention, which may be implemented by a radio device acting as a relay node.

FIG. 6 shows a flowchart for illustrating a method of controlling communication in a wireless communication network. The method of FIG. 6 may be utilized for implementing the illustrated concepts in a radio device which acting as a relay node of a group-based relay link for communication with the wireless communication network. For example, the radio device could correspond to the above-mentioned relay UEs 21, 22, 23, 24, 25, or 26.

If a processor-based implementation of the radio device is used, at least some of the steps of the method of FIG. 6 may be performed and/or controlled by one or more processors of the radio device. Such radio device may also include a memory storing program code for implementing at least some of the below described functionalities or steps of the method of FIG. 6.

At step 610, the radio device may receive first control information from the wireless communication network. The first control information has the purpose of assigning the radio device to of a group of radio devices configured as candidate relay nodes for communication of a further radio device with the wireless communication network. The group may be identified by a group identifier. The radio device may receive the first control information in signaling dedicated to the radio device, e.g., in a unicast control message. Alternatively or in addition, the radio device may receive the first control information in common signaling to multiple radio devices, e.g., in a multicast or broadcast control message, such as broadcasted system information. The radio device may receive receiving at least a part of the first control information from the wireless communication network. Further, the radio device may receive at least a part of the first control information from the further radio device.

The first control information is based on at least one of: distance between the further radio device and the radio device, relative velocity of the further radio device and the radio device, and quality of a signal transmitted between the further radio device and the respective radio device. Alternatively or in addition, the first control information may be based on at least one of: position of the respective radio device, velocity of the respective radio device, quality of a signal transmitted between the respective radio device and a node of the wireless communication network, such as the above-mentioned access node 100.

At step 630, the radio device may receive an indication that the further radio device selected the radio device as relay node for communication of the further radio device with the wireless communication network. For example, the radio device may receive second control information indicating that the further radio device selected the radio device as relay node for communication of the further radio device with the wireless communication network. Alternatively or in addition, in response to the further radio device setting up a D2D communication link to the radio device, the radio device may assume that the further radio device selected the radio device as relay node for communication of the further radio device with the wireless communication network.

At step 640, the radio device may configure a context of a relay link for communication of the further radio device with the wireless communication network. A part of the context may be maintained at the radio device and other radio devices of the group, a further part at the further radio device, and a still further part at the wireless communication network. Information on the one or more radio devices selected by the further radio device, i.e., the result of selection by the further radio device, may be confined to parts of the context maintained by the radio devices of the group and the further radio device.

At step 650, in response to the further radio device selecting the radio device as relay node for communication of the further radio device with the wireless communication network, the radio device relays communication between the further radio device and the wireless communication network. This may comprise relaying at least one message sent by the further radio device to the wireless communication network, i.e., relaying of UL data, and/or relaying at least one message received from the wireless communication network to the further radio device, i.e., relaying of DL of data. In some scenarios, the at least one message received from the further radio device can be addressed by a group identifier to the radio device. In some scenarios, the at least one message received from the wireless communication network may be scrambled based on the group identifier. The radio device may then descrambling the at least one message based on the group identifier.

In some scenarios, the further radio device may newly select one or more of the radio devices from the group as relay node for said communication with the wireless communication network, e.g., due to movement of the further radio device and/or of the radio devices. In this case, if information on the radio devices selected by the further radio device, i.e., the result of selection, is confined to parts of the context maintained by the radio devices of the group and the further radio device as mentioned in connection with step 640. In response to the further radio device newly selecting the radio device and one or more of the other radio devices from the group as relay node for communication of the further radio device with the wireless communication network, the radio device may continue the relaying of communication between the further radio device and the wireless communication network, without modification of the part of the context maintained at the wireless communication network.

Figure 7:
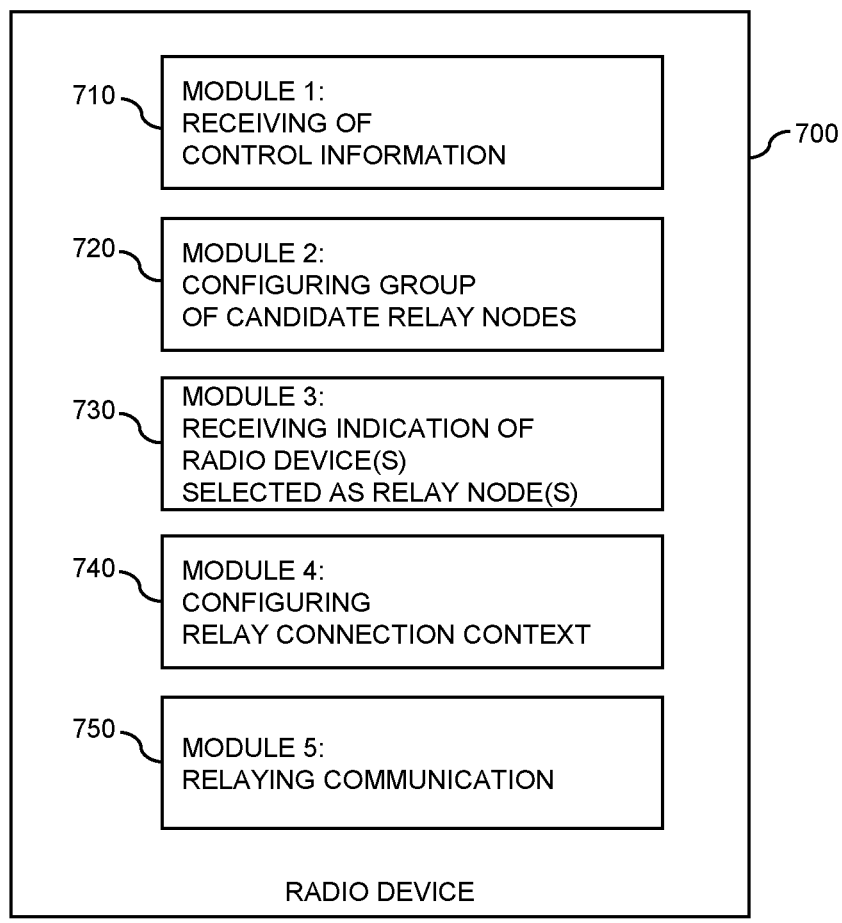
FIG. 7 shows an exemplary block diagram for illustrating functionalities of a radio device implementing functionalities corresponding to the method of FIG. 6.

FIG. 7 shows a block diagram for illustrating functionalities of a radio device 700 which operates according to the method of FIG. 6. The radio device 700 may for example correspond to one of the above-mentioned candidate relay UEs 21, 22, 23, 24, 25, 26. As illustrated, the radio device 700 may be provided with a module 710 configured to receive first control information, such as explained in connection with step 610. Further, the radio device 700 may be provided with a module 720 configured to configure a group of radio devices as candidate relay nodes, such as explained in connection with step 620. Further, the radio device 700 may optionally be provided with a module 730 configured to receive an indication of a selection of one or more radio devices from the group, such as explained in connection with step 630. Further, the radio device 700 may optionally be provided with a module 740 configured to configure a context of a relay link, such as explained in connection with step 640. Further, the radio device 700 may be provided with a module 750 configured to communicate via the selected further radio devices with the wireless communication network, such as explained in connection with step 650.

It is noted that the radio device 700 may include further modules for implementing other functionalities, such as known functionalities of a UE supporting V2X or other types of SL communication. Further, it is noted that the modules of the radio device 700 do not necessarily represent a hardware structure of the radio device 700, but may also correspond to functional elements, e.g., implemented by hardware, software, or a combination thereof.

Figure 8:
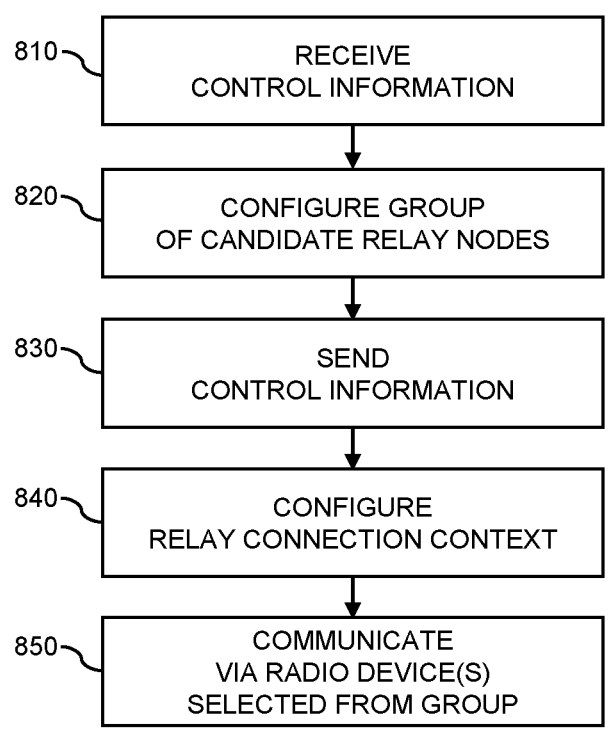
FIG. 8 shows an exemplary flowchart for schematically illustrating a method according to an embodiment of the invention, which may be implemented by a network node.

FIG. 8 shows a flowchart for illustrating a method of controlling communication in a wireless communication network. The method of FIG. 8 may be used for implementing the illustrated concepts in a node of the wireless communication network, such as the above-mentioned access node 100.

If a processor-based implementation of the node is used, at least some of the steps of the method of FIG. 8 may be performed and/or controlled by one or more processors of the node. Such node may also include a memory storing program code for implementing at least some of the below described functionalities or steps of the method of FIG. 8.

At step 810, the node may receive first control information.

At step 820, the a node configures a group of radio devices as candidate relay nodes for communication of a further radio device with the wireless communication network. The radio devices may of for example correspond to the above-mentioned candidate relay UEs 21, 22, 23, 24, 25, 26. The group may be identified by a group identifier.

In some scenarios, the node may configure the group based on the control information received from the further radio device, such as the control information of step 810. In some scenarios, the node may configure the group by sending control information to the radio devices, as indicated by step 830. Further, the node may indicate the group to the further radio device, e.g., by the control information sent at step 830.

The node may configure the group of radio devices based on at least one of: distance between the further radio device and the respective radio device, relative velocity of the further radio device and the respective radio device, and quality of a signal transmitted between the further radio device and the respective radio device. This information can be measured by node and/or reported to the node, e.g., in the control information received at step 810.

Further, the node may configure the group of radio devices based on at least one of: position of the respective radio device, velocity of the respective radio device, and quality of a signal transmitted between the respective radio device and the node. Again, this information can be measured by node and/or reported to the node, e.g., in the control information received at step 810.

At step 840, the node may configure a context of a relay link for communication with the further radio device via the selected one or more radio devices. A part of the context may be maintained at the radio devices of the group, a further part at the further radio device, and a still further part at the wireless communication network. Information on the one or more radio devices selected by the further radio device, i.e., the result of selection by the further radio device, may be confined to parts of the context maintained by the radio devices of the group and the further radio device.

At step 850, the node communicates with the further radio device via one or more radio devices selected as relay node from the group by the further radio device. This may involve that the node receives at least one message via the selected one or more radio devices from the further radio device, i.e., UL communication of data. If the group is identified by a group identifier, the node may descramble the received at least one message based on the group identifier. Alternatively or in addition, the communication with the further radio device may involve that the node sends at least one message via the selected one or more radio devices to the further radio device, i.e., DL communication of data. If the group is identified by a group identifier, the node may scramble the message to the further radio device based on the group identifier.

In some scenarios, the further radio device may newly select one or more of the radio devices from the group as relay node for said communication with the wireless communication network, e.g., due to movement of the further radio device and/or of the radio devices. In this case, if information on the radio devices selected by the further radio device, i.e., the result of selection, is confined to parts of the context maintained by the radio devices of the group and the further radio device as mentioned in connection with step 840. In response to the further radio device newly selecting the radio device and one or more of the other radio devices from the group as relay node for communication of the further radio device with the wireless communication network, the node may continue communicating with the further radio device via the newly selected one or more radio devices, without modification of the part of the context maintained by the node.

Figure 9:
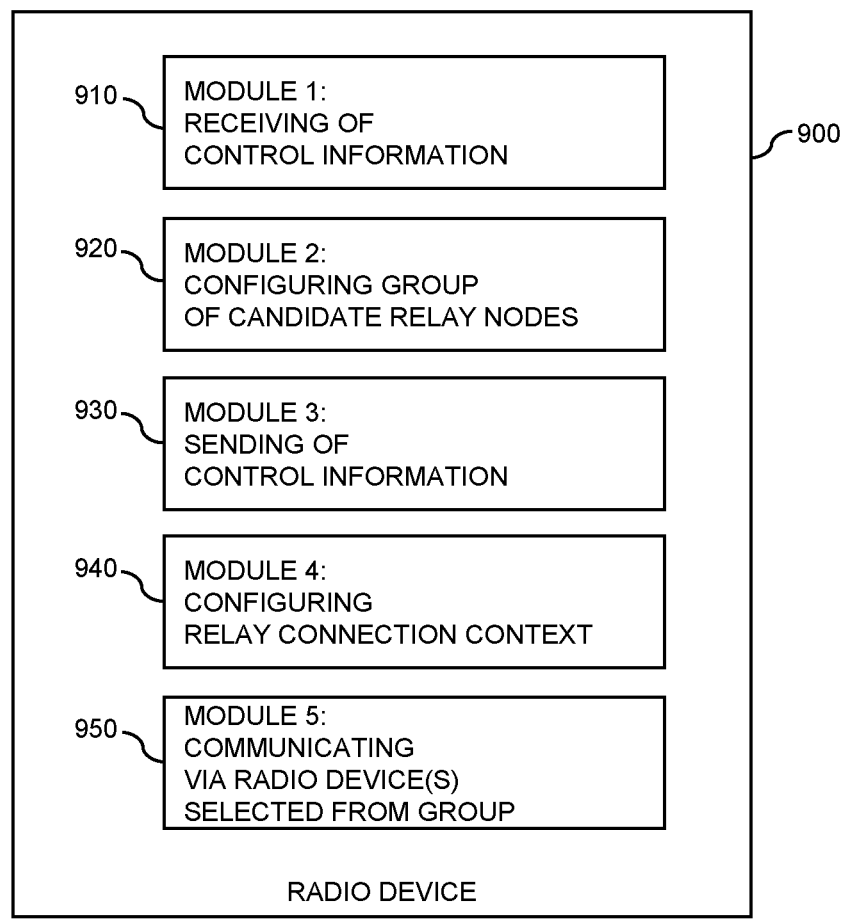
FIG. 9 shows an exemplary block diagram for illustrating functionalities of a network node implementing functionalities corresponding to the method of FIG. 8.

FIG. 9 shows a block diagram for illustrating functionalities of a network node 900 which operates according to the method of FIG. 8. The network node 900 may for example correspond to one of the above-mentioned access node 100. As illustrated, the network node 900 may optionally be provided with a module 910 configured to receive control information, such as explained in connection with step 910. Further, the network node 900 may be provided with a module 920 configured to configure a group of radio devices as candidate relay nodes, such as explained in connection with step 820. Further, the network node 900 may optionally be provided with a module 930 configured to send control information, such as explained in connection with step 830. Further, the network node 900 may optionally be provided with a module 840 configured to configure a context of a relay link, such as explained in connection with step 840. Further, the network node 900 may be provided with a module 850 configured to communicate via the selected further radio devices with the further radio device, such as explained in connection with step 850.

It is noted that the network node 900 may include further modules for implementing other functionalities, such as known functionalities of an access node like an eNB of the LTE radio technology or a gNB of the NR technology. Further, it is noted that the modules of the network node 900 do not necessarily represent a hardware structure of the network node 900, but may also correspond to functional elements, e.g., implemented by hardware, software, or a combination thereof.

It is noted that the functionalities as explained in connection with FIGS. 4 to 9 could be combined in various ways. For example, the same radio device could implement all the functionalities as explained in connection with FIGS. 4 to 7, i.e., the same radio device could support operation as a candidate relay UE and operation as a remote UE. Further, a radio device implementing functionalities for operating as a remote UE as explained in connection with FIGS. 4 and 5 could be combined in a system with radio devices implementing functionalities for operation of the radio device as a candidate relay UE as explained in connection with FIGS. 7 and 8. Further, such system could also include a network node which configures the group of candidate relay nodes, e.g., based on functionalities as described in connection with FIGS. 8 and 9. Here, it is noted that in some scenarios a network node could also participate in configuration of the group of candidate relay nodes, e.g., based on functionalities corresponding to steps 810, 820, 830, and/or 840 of FIG. 8, but not participate itself in the communication, e.g., if the network node corresponds to a more centralized control node, e.g., a node of a core network part of the wireless communication network.

Figure 10:
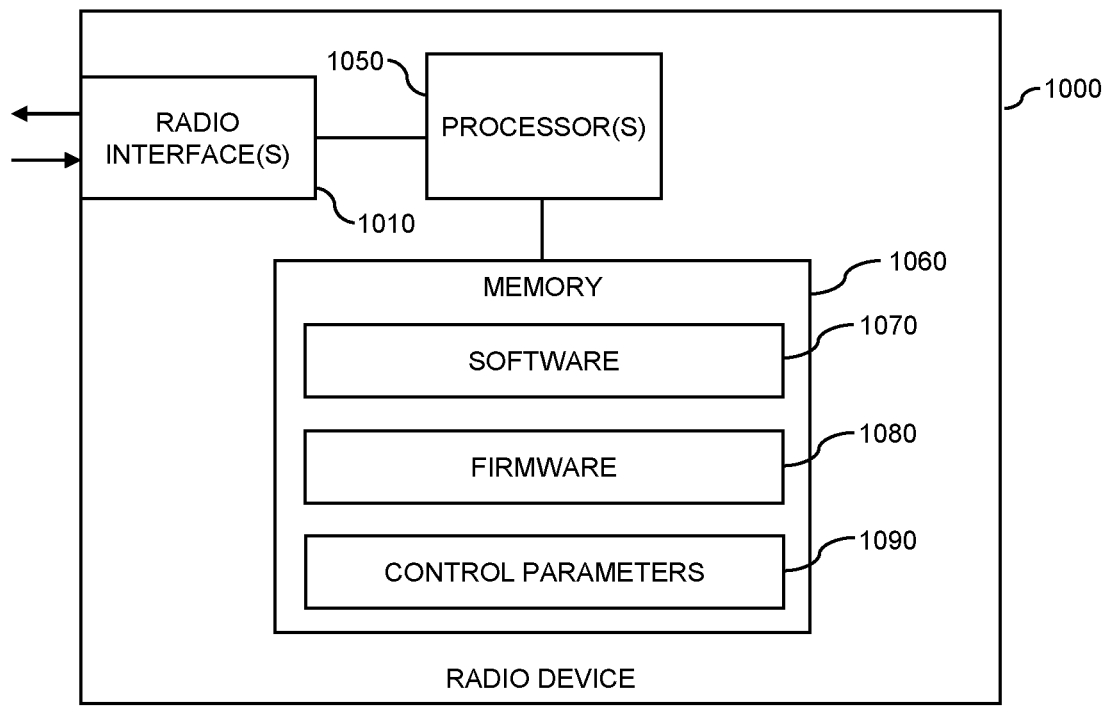
FIG. 10 schematically illustrates structures of a radio device according to an embodiment of the invention.

FIG. 10 illustrates a processor-based implementation of a radio device 1000 which may be used for implementing the above described concepts. For example, the structures as illustrated in FIG. 10 may be used for implementing the concepts in the above-mentioned UEs 11, 12, 21, 22, 23, 24, 25, 26.

As illustrated, the radio device 1000 includes one or more radio interfaces 1010. The radio interface(s) 1010 may for example support a wireless access technology supporting D2D radio transmission, such as for example the LTE radio technology or NR radio technology. Furthermore, the radio interface(s) 1010 may support DL radio transmissions and UL radio transmissions with a wireless communication network.

Further, the radio device 1000 may include one or more processors 1050 coupled to the radio interface(s) 1010 and a memory 1060 coupled to the processor(s) 1050. By way of example, the radio interface(s) 1010, the processor(s) 1050, and the memory 1060 could be coupled by one or more internal bus systems of the radio device 1000. The memory 1060 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1060 may include software 1070, firmware 1080, and/or control parameters 1090. The memory 1060 may include suitably configured program code to be executed by the processor(s) 1050 so as to implement the above-described functionalities of a radio device, such as explained in connection with FIGS. 4 to 7.

It is to be understood that the structures as illustrated in FIG. 10 are merely schematic and that the radio device 1000 may actually include further components which, for the sake of clarity, have not been illustrated, e.g., further interfaces or processors. Also, it is to be understood that the memory 1060 may include further program code for implementing known functionalities of a UE supporting D2D radio transmissions, e.g., for implementing V2X communication. According to some embodiments, also a computer program may be provided for implementing functionalities of the radio device 1000, e.g., in the form of a physical medium storing the program code and/or other data to be stored in the memory 1060 or by making the program code available for download or by streaming.

Figure 11:
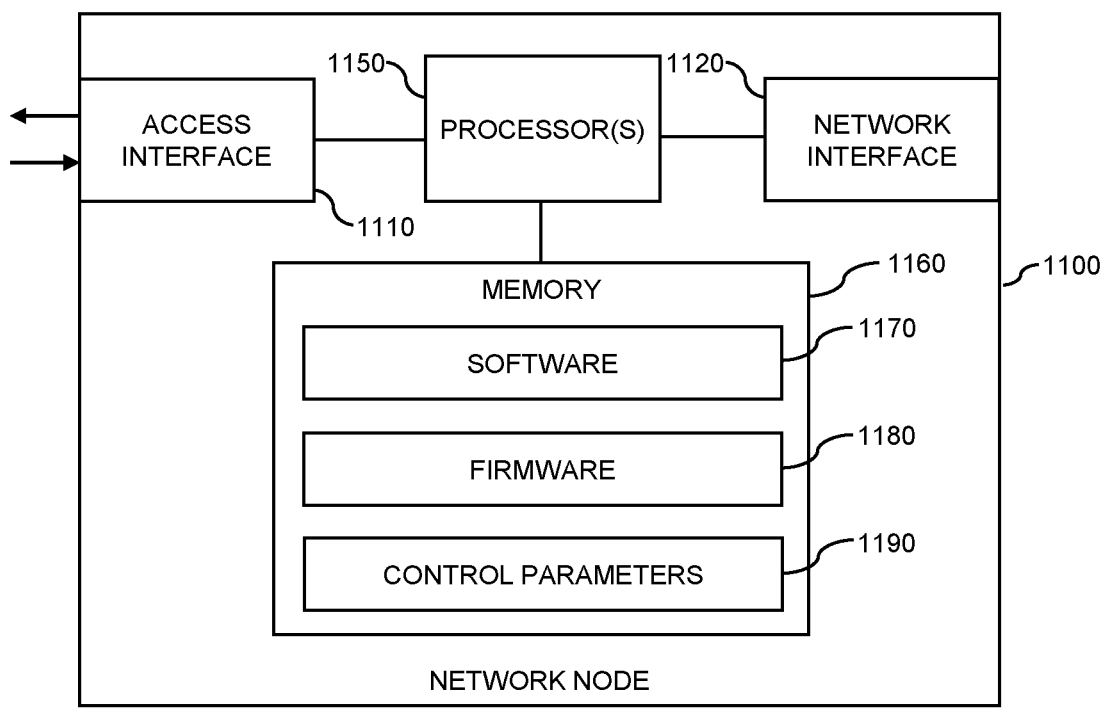
FIG. 11 schematically illustrates structures of a network node according to an embodiment of the invention.

FIG. 11 illustrates a processor-based implementation of a network node 1100 which may be used for implementing the above described concepts. For example, the structures as illustrated in FIG. 11 may be used for implementing the concepts in the above-mentioned access node 100.

As illustrated, the network node 1100 includes an access interface 1110. The access interface 1110 may be used for communication with one or more radio devices by DL radio transmissions and UL radio transmissions and for controlling these radio devices. If the network node corresponds to an access node, the access interface 1110 may be a radio interface. However, in some scenarios the network node 1100 could also correspond to a more centralized node, e.g., a core network node. In this case, the access interface 1100 could also correspond to an interface for communication with an access node serving the radio devices. The above-mentioned UEs 11, 12, 21, 22, 23, 24, 25, 26 are examples of such radio devices. As further illustrated, the network node 1100 may also include a network interface 1120 which may be used for communication with other network nodes.

Further, the network node 1100 may include one or more processors 1150 coupled to the access interface 1110 and a memory 1160 coupled to the processor(s) 1150. By way of example, the access interface 1110, the processor(s) 1150, and the memory 1160 could be coupled by one or more internal bus systems of the network node 1100. The memory 1160 may include a ROM, e.g., a flash ROM, a RAM, e.g., a DRAM or SRAM, a mass storage, e.g., a hard disk or solid state disk, or the like. As illustrated, the memory 1160 may include software 1170, firmware 1180, and/or control parameters 1190. The memory 1160 may include suitably configured program code to be executed by the processor(s) 1150 so as to implement the above-described functionalities of a network node, such as explained in connection with FIGS. 19 and 20.

It is to be understood that the structures as illustrated in FIG. 11 are merely schematic and that the network node 1100 may actually include further components which, for the sake of clarity, have not been illustrated, e.g., further interfaces or processors. Also, it is to be understood that the memory 1160 may include further program code for implementing known functionalities of eNB of the LTE radio technology, a gNB of the NR radio technology, or similar network node. According to some embodiments, also a computer program may be provided for implementing functionalities of the network node 1100, e.g., in the form of a physical medium storing the program code and/or other data to be stored in the memory 1160 or by making the program code available for download or by streaming.

As can be seen, the concepts as described above may be used for efficient utilization of UEs as relay nodes. For example, the concepts may allow for increasing the life time of relay paths, reducing the number of relay path reconfigurations. Especially re-configurations of relay paths in network nodes can be reduced, for example when the remote UE does not change the relay group when selecting a new relay UE. As a consequence, it may be possible to reduce signaling overhead, processing overhead, and/or the number or durations of service interruptions.

It is to be understood that the examples and embodiments as explained above are merely illustrative and susceptible to various modifications. For example, the illustrated concepts may be applied in connection with various kinds of radio technologies, without limitation to the above-mentioned examples of the LTE radio technology or NR radio technology. Further, it is noted that the concepts are not limited to V2X scenarios, but could be used for managing relay based communications also for various other UE types, such as devices carried by a user, like mobile phones, smart phones, laptop computers, tablet computers, wearable devices, or the like. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

In view of the above, embodiments provided by the present disclosure include:

Embodiment 1

A method of controlling communication in a wireless communication network, the method comprising:
a radio device (11; 12; 500; 1000) configuring a group of further radio devices (21, 22, 23; 24, 25, 26; 700; 1000) as candidate relay nodes for communication with the wireless communication network;
the radio device (11; 12; 500; 1000) selecting one or more of the further radio devices (21, 22, 23; 24, 25, 26; 700; 1000) from the group as relay node for communication with the wireless communication network; and
the radio device (11; 12; 500; 1000) communicating with the wireless communication network via said one or more selected further radio devices (21, 22, 23; 24, 25, 26; 700; 1000).

Embodiment 2

The method according to embodiment 1, comprising:
the radio device (11; 12; 500; 1000) receiving first control information from the wireless communication network; and
the radio device (11; 12; 500; 1000) configuring the group based on the received control information.

Embodiment 3

The method according to embodiment 1 or 2, comprising:
the radio device (11; 12; 500; 1000) configuring the group based on at least one of: distance between the radio device (11; 12; 500; 1000) and the respective further radio device (21, 22, 23; 24, 25, 26; 700; 1000), relative velocity of the radio device (11; 12; 500; 1000) and the respective further radio device (21, 22, 23; 24, 25, 26; 700; 1000), quality of a signal transmitted between the radio device (11; 12; 500; 1000) and the respective further radio device (21, 22, 23; 24, 25, 26; 700; 1000).

Embodiment 4

The method according to embodiment 3, comprising:
the radio device (11; 12; 500; 1000) indicating the configured group to the wireless communication network.

Embodiment 5

The method according to any one of embodiments 1 to 4, comprising:
the radio device (11; 12; 500; 1000) indicating the selected one or more further radio devices (21, 22, 23; 24, 25, 26; 700; 1000) to the group of further radio devices.

Embodiment 6

The method according to embodiment 5, comprising:
the radio device (11; 12; 500; 1000) sending second control information indicating the selected one or more further radio devices (21, 22, 23; 24, 25, 26; 700; 1000) to the group of further radio devices.

Embodiment 7

The method according to embodiment 5 or 6, comprising:
the radio device (11; 12; 500; 1000) indicating the selected one or more further radio devices (21, 22, 23; 24, 25, 26; 700; 1000) to the group by setting up a device-to-device communication link to said one or more further selected radio devices (21, 22, 23; 24, 25, 26; 700; 1000).

Embodiment 8

The method according to any one of embodiments 1 to 7, wherein said selecting of the one or more further radio devices (21, 22, 23; 24, 25, 26; 700; 1000) is based on at least one of: distance between the radio device (11; 12; 500; 1000) and the respective further radio device (21, 22, 23; 24, 25, 26; 700; 1000), relative velocity of the radio device (11; 12; 500; 1000) and the respective further radio device (21, 22, 23; 24, 25, 26; 700; 1000), quality of a signal transmitted between the radio device (11; 12; 500; 1000) and the respective further radio device (21, 22, 23; 24, 25, 26; 700; 1000).

Embodiment 9

The method according to any one of embodiments 1 to 8, wherein the group is identified by a group identifier.

Embodiment 10

The method according to embodiment 9, comprising:
the radio device (11; 12; 500; 1000) sending at least one message via the selected one or more further radio devices (21, 22, 23; 24, 25, 26; 700; 1000) to the wireless communication network; and the radio device (11; 12; 500; 1000) addressing the at least one message by the group identifier to the selected one or more further radio devices (21, 22, 23; 24, 25, 26; 700; 1000).

Embodiment 11

The method according to any one of embodiments 1 to 10, comprising:
configuring a context of a relay link for said communicating with the wireless communication network via said one or more selected further radio devices (21, 22, 23; 24, 25, 26; 700; 1000),
wherein information on the selected one or more further radio devices (21, 22, 23; 24, 25, 26; 700; 1000) is confined to parts of the context maintained by the radio device (11, 12) and the further radio devices (21, 22, 22; 24, 25, 26).

Embodiment 12

The method according to embodiment 11, comprising:
the radio device (11; 12; 500; 1000) newly selecting one or more of the further radio devices (21, 22, 23; 24, 25, 26; 700; 1000) from the group as relay node for said communication with the wireless communication network, and the radio device (11; 12; 500; 1000) continuing said communication with the wireless communication network via said one or more newly selected further radio devices (21, 22, 23; 24, 25, 26; 700; 1000), without modification of a part of the context maintained at the wireless communication network.

Embodiment 13

A method of controlling communication in a wireless communication network, the method comprising:
a radio device (21, 22, 23; 24, 25, 26; 700; 1000) receiving first control information for assigning the radio device (21, 22, 23; 24, 25, 26; 700; 1000) to of a group of radio devices (21, 22, 23; 24, 25, 26; 700; 1000) configured as candidate relay nodes for communication of a further radio device (11; 12; 500; 1000) with the wireless communication network; and in response to the further radio device (11; 12; 500; 1000) selecting the radio device (21, 22, 23; 24, 25, 26; 700; 1000) as relay node for communication of the further radio device (11; 12; 500; 1000) with the wireless communication network, the radio device (21, 22, 23; 24, 25, 26; 700; 1000) relaying communication between the further radio device (11; 12; 500; 1000) and the wireless communication network.

Embodiment 14

The method according to embodiment 13, comprising:
the radio device (21, 22, 23; 24, 25, 26; 700; 1000) receiving at least a part of the first control information from the wireless communication network.

Embodiment 15

The method according to embodiment 13 or 14, comprising:
the radio device (21, 22, 23; 24, 25, 26; 700; 1000) receiving at least a part of the first control information from the further radio device (11; 12; 500; 1000).

Embodiment 16

The method according to any one of embodiments 13 to 15,
wherein the first control information is based on at least one of: distance between the further radio device (11; 12; 500; 1000) and the radio device (21, 22, 23; 24, 25, 26; 700; 1000), relative velocity of the further radio device (11; 12; 500; 1000) and the radio device (21, 22, 23; 24, 25, 26; 700; 1000), quality of a signal transmitted between the further radio device (11; 12; 500; 1000) and the respective radio device (21, 22, 23; 24, 25, 26; 700; 1000).

Embodiment 17

The method according to any one of embodiments 13 to 16, wherein the first control information is based on at least one of: position of the respective radio device (21, 22, 23; 24, 25, 26; 700; 1000), velocity of the respective radio device (21, 22, 23; 24, 25, 26; 700; 1000), quality of a signal transmitted between the respective radio device (21, 22, 23; 24, 25, 26; 700; 1000) and the node (100; 900; 1100).

Embodiment 18

The method according to any one of embodiments 13 to 17, comprising:
the radio device (21, 22, 23; 24, 25, 26; 700; 1000) receiving an indication that the further radio device (11; 12; 500; 1000) selected the radio device (21, 22, 23; 24, 25, 26; 700; 1000) as relay node for communication of the further radio device (11; 12; 500; 1000) with the wireless communication network.

Embodiment 19

The method according to embodiment 18, comprising:
the radio device (21, 22, 23; 24, 25, 26; 700; 1000) receiving second control information indicating that the further radio device (11; 12; 500; 1000) selected the radio device (21, 22, 23; 24, 25, 26; 700; 1000) as relay node for communication of the further radio device (11; 12; 500; 1000) with the wireless communication network.

Embodiment 20

The method according to embodiment 18 or 19, comprising:
in response to the further radio device (11; 12; 500; 1000) setting up a device-to-device communication link to the radio device (21, 22, 23; 24, 25, 26; 700; 1000), the radio device (21, 22, 23; 24, 25, 26; 700; 1000) assuming that the further radio device (11; 12; 500; 1000) selected the radio device (21, 22, 23; 24, 25, 26; 700; 1000) as relay node for communication of the further radio device (11; 12; 500; 1000) with the wireless communication network.

Embodiment 21

The method according to any one of embodiments 13 to 20,
wherein the group is identified by a group identifier.

Embodiment 22

The method according to embodiment 21, comprising:
the radio device (21, 22, 23; 24, 25, 26; 700; 1000) receiving at least one message from the further radio device (11; 12; 500; 1000), the at least one message being addressed by the group identifier to the radio device (21, 22, 23; 24, 25, 26; 700; 1000); and the radio device (21, 22, 23; 24, 25, 26; 700; 1000) relaying the at least one message to the wireless communication network.

Embodiment 23

The method according to embodiment 21 or 22, comprising:
based on the group identifier, the radio device (21, 22, 23; 24, 25, 26; 700; 1000) scrambling the at least one message relayed to the wireless communication network.

Embodiment 24

The method according to any one of embodiments 21 to 23, comprising:
the radio device (21, 22, 23; 24, 25, 26; 700; 1000) receiving at least one message from the wireless communication network, the at least one message being scrambled based on the group identifier;
based on the group identifier, the radio device (21, 22, 23; 24, 25, 26; 700; 1000) descrambling the at least one message; and
the radio device (21, 22, 23; 24, 25, 26; 700; 1000) relaying the at least one message to the further radio device (11; 12; 500; 1000).

Embodiment 25

The method according to any one of embodiments 13 to 24, comprising:
configuring a context of a relay link for said communication of the further radio device (11; 12; 500; 1000) with the wireless communication network,
wherein information on the selected one or more further radio devices (21, 22, 23; 24, 25, 26; 700; 1000) is confined to parts of the context maintained by the radio device (11, 12) and the further radio devices (21, 22, 22; 24, 25, 26).

Embodiment 26

The method according to embodiment 25, comprising:
in response to the further radio device (11; 12; 500; 1000) newly selecting the radio device (11; 12; 500; 1000) and one or more of the other radio devices (21, 22, 23; 24, 25, 26; 700; 1000) from the group as relay node for communication of the further radio device (11; 12; 500; 1000) with the wireless communication network, the radio device (11; 12; 500; 1000) continuing said relaying of communication between the further radio device (11; 12; 500; 1000) and the wireless communication network, without modification of a part of the context maintained at the wireless communication network.

Embodiment 27

A method of controlling device-to-device communication in a wireless communication network, the method comprising:
a node (100; 900; 1100) of the wireless communication network configuring a group of radio devices (21, 22, 23; 24, 25, 26; 700; 1000) as candidate relay nodes for communication of a further radio device (11; 12; 500; 1000) with the wireless communication network; and
the node (100; 900; 1100) communicating with the further radio device (11; 12; 500; 1000) via one or more radio devices (21, 22, 23; 24, 25, 26; 700; 1000) selected as relay node from the group by the further radio device (11; 12; 500; 1000).

Embodiment 28

The method according to embodiment 27, comprising:
the node (100; 900; 1100) configuring the group by sending first control information to the radio devices (21, 22, 23; 24, 25, 26; 700; 1000).

Embodiment 29

The method according to embodiment 27 or 28, comprising:
the node (100; 900; 1100) configuring the group based on second control information received from the further radio device (11; 12; 500; 1000).

Embodiment 30

The method according to any one of embodiments 27 to 29, comprising:
the node (100; 900; 1100) configuring the group of radio devices based on at least one of: distance between the further radio device (11; 12; 500; 1000) and the respective radio device (21, 22, 23; 24, 25, 26; 700; 1000), relative velocity of the further radio device (11; 12; 500; 1000) and the respective radio device (21, 22, 23; 24, 25, 26; 700; 1000), quality of a signal transmitted between the further radio device (11; 12; 500; 1000) and the respective radio device (21, 22, 23; 24, 25, 26; 700; 1000).

Embodiment 31

The method according to any one of embodiments 27 to 30, comprising:
the node (100; 900; 1100) configuring the group of radio devices based on at least one of: position of the respective radio device (21, 22, 23; 24, 25, 26; 700; 1000), velocity of the respective radio device (21, 22, 23; 24, 25, 26; 700; 1000), quality of a signal transmitted between the respective radio device (21, 22, 23; 24, 25, 26; 700; 1000) and the node (100; 900; 1100).

Embodiment 32

The method according to any one of embodiments 27 to 31, comprising:
the node (100; 900; 1100) indicating the group to the further radio device (11; 12; 500; 1000).

Embodiment 33

The method according to any one of embodiments 27 to 32,
wherein the group of is identified by a group identifier.

Embodiment 34

The method according to embodiment 33, comprising:
the node (100; 900; 1100) receiving at least one message via the selected one or more radio devices (21, 22, 23; 24, 25, 26; 700; 1000) from the further radio device (11; 12; 500; 1000), the at least one message being scrambled based on the group identifier; and based on the group identifier, the node (100; 900; 1100) descrambling the at least one message.

Embodiment 35

The method according to embodiment 33 or 34, comprising:
the node (100; 900; 1100) sending at least one message via the selected one or more radio devices (21, 22, 23; 24, 25, 26; 700; 1000) to the further radio device (11; 12; 500; 1000); and
the node (100; 900; 1100) scrambling the at least one message based on the group identifier.

Embodiment 36

The method according to any one of the embodiments 27 to 35, comprising:
configuring a context of a relay link for said communicating with the further radio device (11; 12; 500; 1000) via the selected one or more radio devices (21, 22, 23; 24, 25, 26; 700; 1000), wherein information on the selected one or more further radio devices (21, 22, 23; 24, 25, 26; 700; 1000) is confined to parts of the context maintained by the radio device (11, 12) and the further radio devices (21, 22, 22; 24, 25, 26).

Embodiment 37

The method according to embodiment 36, comprising:
in response to the further radio device (11; 12; 500; 1000) newly selecting one or more of the radio devices (21, 22, 23; 24, 25, 26; 700; 1000) from the group as relay node for communication with the wireless communication network, the node (100; 900; 1100) continuing said communicating with the further radio device (11; 12; 500; 1000) via the newly selected one or more radio devices (21, 22, 23; 24, 25, 26; 700; 1000), without modification of a part of the context maintained by the node (100; 900; 1100).

Embodiment 38

A radio device (11; 12; 500; 1000) for a wireless communication network, the radio device (11; 12; 500; 1000) being configured to:
configure a group of further radio devices (21, 22, 23; 24, 25, 26; 700; 1000) as candidate relay nodes for communication with the wireless communication network;
select one or more of the further radio devices (21, 22, 23; 24, 25, 26; 700; 1000) from the group as relay node for communication with the wireless communication network; and
communicate with the wireless communication network via said one or more selected further radio devices (21, 22, 23; 24, 25, 26; 700; 1000).

Embodiment 39

The radio device (11; 12; 500; 1000) according to embodiment 38,
wherein the radio device (11; 12; 500; 1000) is configured to receive first control information from the wireless communication network; and
the radio device (11; 12; 500; 1000) configuring the group based on the received control information.

Embodiment 40

The radio device (11; 12; 500; 1000) according to embodiment 38 or 39, comprising:
wherein the radio device (11; 12; 500; 1000) is configured to configure the group based on at least one of: distance between the radio device (11; 12; 500; 1000) and the respective further radio device (21, 22, 23; 24, 25, 26; 700; 1000), relative velocity of the radio device (11; 12; 500; 1000) and the respective further radio device (21, 22, 23; 24, 25, 26; 700; 1000), quality of a signal transmitted between the radio device (11; 12; 500; 1000) and the respective further radio device (21, 22, 23; 24, 25, 26; 700; 1000).

Embodiment 41

The radio device (11; 12; 500; 1000) according to embodiment 40,
wherein the radio device (11; 12; 500; 1000) is configured to indicate the configured group to the wireless communication network.

Embodiment 42

The radio device (11; 12; 500; 1000) according to any one of embodiments 38 to 41, comprising:
wherein the radio device (11; 12; 500; 1000) is configured to indicate the selected one or more further radio devices (21, 22, 23; 24, 25, 26; 700; 1000) to the group of further radio devices.

Embodiment 43

The radio device (11; 12; 500; 1000) according to embodiment 42,
wherein the radio device (11; 12; 500; 1000) is configured to send second control information indicating the selected one or more further radio devices (21, 22, 23; 24, 25, 26; 700; 1000) to the group of further radio devices.

Embodiment 44

The radio device (11; 12; 500; 1000) according to embodiment 42 or 43,
wherein the radio device (11; 12; 500; 1000) is configured to indicate the selected one or more further radio devices (21, 22, 23; 24, 25, 26; 700; 1000) to the group by setting up a device-to-device communication link to said one or more further selected radio devices (21, 22, 23; 24, 25, 26; 700; 1000).

Embodiment 45

The radio device (11; 12; 500; 1000) according to any one of embodiments 38 to 44,
wherein the radio device (11; 12; 500; 1000) is configured to select the of the one or more further radio devices (21, 22, 23; 24, 25, 26; 700; 1000) based on at least one of: distance between the radio device (11; 12; 500; 1000) and the respective further radio device (21, 22, 23; 24, 25, 26; 700; 1000), relative velocity of the radio device (11; 12; 500; 1000) and the respective further radio device (21, 22, 23; 24, 25, 26; 700; 1000), quality of a signal transmitted between the radio device (11; 12; 500; 1000) and the respective further radio device (21, 22, 23; 24, 25, 26; 700; 1000).

Embodiment 46

The radio device (11; 12; 500; 1000) according to any one of embodiments 38 to 45,
wherein the group is identified by a group identifier.

Embodiment 47

The radio device (11; 12; 500; 1000) according to embodiment 46,
wherein the radio device (11; 12; 500; 1000) is configured to:
send at least one message via the selected one or more further radio devices (21, 22, 23; 24, 25, 26; 700; 1000) to the wireless communication network; and
address the at least one message by the group identifier to the selected one or more further radio devices (21, 22, 23; 24, 25, 26; 700; 1000).

Embodiment 48

The radio device (11; 12; 500; 1000) according to any one of embodiments 38 to 47,
wherein the radio device (11; 12; 500; 1000) is configured to configure a context of a relay link for said communicating with the wireless communication network via said one or more selected further radio devices (21, 22, 23; 24, 25, 26; 700; 1000),
wherein information on the selected one or more further radio devices (21, 22, 23; 24, 25, 26; 700; 1000) is confined to parts of the context maintained by the radio device (11, 12) and the further radio devices (21, 22, 22; 24, 25, 26).

Embodiment 49

The radio device (11; 12; 500; 1000) according to embodiment 48,
wherein the radio device (11; 12; 500; 1000) is configured to:
newly select one or more of the further radio devices (21, 22, 23; 24, 25, 26; 700; 1000) from the group as relay node for said communication with the wireless communication network, and
continue said communication with the wireless communication network via said one or more newly selected further radio devices (21, 22, 23; 24, 25, 26; 700; 1000), without modification of a part of the context maintained at the wireless communication network.

Embodiment 50

The radio device (11; 12; 500; 1000) according to any one of embodiments 38 to 49,
wherein the radio device (11; 12; 500; 1000) is configured to perform the steps of a method according to any one of embodiments 2 to 12.

Embodiment 51

The radio device (11; 12; 500; 1000) according to any one of embodiments 38 to 50, comprising:
at least one processor (1050) and a memory (1060) containing instructions executable by said at least one processor (1050), whereby the radio device (11; 12; 500; 1000) is operative to perform a method according to any one of embodiments 1 to 12.

Embodiment 52

A radio device (21, 22, 23; 24, 25, 26; 700; 1000) for a wireless communication network, the radio device (21, 22, 23; 24, 25, 26; 700; 1000) being configured to:
receive first control information for assigning the radio device (21, 22, 23; 24, 25, 26; 700; 1000) to of a group of radio devices (21, 22, 23; 24, 25, 26; 700; 1000) configured as candidate relay nodes for communication of a further radio device (11; 12; 500; 1000) with the wireless communication network; and
in response to the further radio device (11; 12; 500; 1000) selecting the radio device (21, 22, 23; 24, 25, 26; 700; 1000) as relay node for communication of the further radio device (11; 12; 500; 1000) with the wireless communication network, relay communication between the further radio device (11; 12; 500; 1000) and the wireless communication network.

Embodiment 53

The radio device (21, 22, 23; 24, 25, 26; 700; 1000) according to embodiment 52, wherein the radio device (21, 22, 23; 24, 25, 26; 700; 1000) is configured to receive at least a part of the first control information from the wireless communication network.

Embodiment 54

The radio device (21, 22, 23; 24, 25, 26; 700; 1000) according to embodiment 52 or 53, wherein the radio device (21, 22, 23; 24, 25, 26; 700; 1000) is configured to receive at least a part of the first control information from the further radio device (11; 12; 500; 1000).

Embodiment 55

The radio device (21, 22, 23; 24, 25, 26; 700; 1000) according to any one of embodiments 52 to 54,
wherein the first control information is based on at least one of: distance between the further radio device (11; 12; 500; 1000) and the radio device (21, 22, 23; 24, 25, 26; 700; 1000), relative velocity of the further radio device (11; 12; 500; 1000) and the radio device (21, 22, 23; 24, 25, 26; 700; 1000), quality of a signal transmitted between the further radio device (11; 12; 500; 1000) and the respective radio device (21, 22, 23; 24, 25, 26; 700; 1000).

Embodiment 56

The radio device (21, 22, 23; 24, 25, 26; 700; 1000) according to any one of embodiments 52 to 55,
wherein the first control information is based on at least one of: position of the respective radio device (21, 22, 23; 24, 25, 26; 700; 1000), velocity of the respective radio device (21, 22, 23; 24, 25, 26; 700; 1000), quality of a signal transmitted between the respective radio device (21, 22, 23; 24, 25, 26; 700; 1000) and the node (100; 900; 1100).

Embodiment 57

The radio device (21, 22, 23; 24, 25, 26; 700; 1000) according to any one of embodiments 52 to 56,
wherein the radio device (21, 22, 23; 24, 25, 26; 700; 1000) is configured to receive an indication that the further radio device (11; 12; 500; 1000) selected the radio device (21, 22, 23; 24, 25, 26; 700; 1000) as relay node for communication of the further radio device (11; 12; 500; 1000) with the wireless communication network.

Embodiment 58

The radio device (21, 22, 23; 24, 25, 26; 700; 1000) according to embodiment 57,
wherein the radio device (21, 22, 23; 24, 25, 26; 700; 1000) is configured to receive second control information indicating that the further radio device (11; 12; 500; 1000) selected the radio device (21, 22, 23; 24, 25, 26; 700; 1000) as relay node for communication of the further radio device (11; 12; 500; 1000) with the wireless communication network.

Embodiment 59

The radio device (21, 22, 23; 24, 25, 26; 700; 1000) according to embodiment 57 or 58,
wherein the radio device (21, 22, 23; 24, 25, 26; 700; 1000) is configured to:
in response to the further radio device (11; 12; 500; 1000) setting up a device-to-device communication link to the radio device (21, 22, 23; 24, 25, 26; 700; 1000), assume that the further radio device (11; 12; 500; 1000) selected the radio device (21, 22, 23; 24, 25, 26; 700; 1000) as relay node for communication of the further radio device (11; 12; 500; 1000) with the wireless communication network.

Embodiment 60

The radio device (21, 22, 23; 24, 25, 26; 700; 1000) according to any one of embodiments 52 to 59,
wherein the group is identified by a group identifier.

Embodiment 61

The radio device (21, 22, 23; 24, 25, 26; 700; 1000) according to embodiment 60,
wherein the radio device (21, 22, 23; 24, 25, 26; 700; 1000) is configured to:
  receive at least one message from the further radio device (11; 12; 500; 1000), the at least one message being addressed by the group identifier to the radio device (21, 22, 23; 24, 25, 26; 700; 1000); and
  relay the at least one message to the wireless communication network.

Embodiment 62

The radio device (21, 22, 23; 24, 25, 26; 700; 1000) according to embodiment 60 or 61,
wherein the radio device (21, 22, 23; 24, 25, 26; 700; 1000) is configured to scramble the at least one message relayed to the wireless communication network based on the group identifier.

Embodiment 63

The radio device (21, 22, 23; 24, 25, 26; 700; 1000) according to any one of embodiments 60 to 62,
wherein the radio device (21, 22, 23; 24, 25, 26; 700; 1000) is configured to:
  receive at least one message from the wireless communication network, the at least one message being scrambled based on the group identifier;
  based on the group identifier, descramble the at least one message; and
  relay the at least one message to the further radio device (11; 12; 500; 1000).

Embodiment 64

The radio device (21, 22, 23; 24, 25, 26; 700; 1000) according to any one of embodiments 52 to 63,
wherein the radio device (21, 22, 23; 24, 25, 26; 700; 1000) is configured to configure a context of a relay link for said communication of the further radio device (11; 12; 500; 1000) with the wireless communication network,
wherein information on the selected one or more further radio devices (21, 22, 23; 24, 25, 26; 700; 1000) is confined to parts of the context maintained by the radio device (11, 12) and the further radio devices (21, 22, 22; 24, 25, 26).

Embodiment 65

The radio device (21, 22, 23; 24, 25, 26; 700; 1000) according to embodiment 64,
wherein the radio device (21, 22, 23; 24, 25, 26; 700; 1000) is configured to:
  in response to the further radio device (11; 12; 500; 1000) newly selecting the radio device (11; 12; 500; 1000) and one or more of the other radio devices (21, 22, 23; 24, 25, 26; 700; 1000) from the group as relay node for communication of the further radio device (11; 12; 500; 1000) with the wireless communication network, the radio device (11; 12; 500; 1000) continuing said relaying of communication between the further radio device (11; 12; 500; 1000) and the wireless communication network, without modification of a part of the context maintained at the wireless communication network.

Embodiment 66

The radio device (21, 22, 23; 24, 25, 26; 700; 1000) according to any one of embodiments 52 to 65,
wherein the radio device (21, 22, 23; 24, 25, 26; 700; 1000) is configured to perform the steps of a method according to any one of embodiments 14 to 26.

Embodiment 67

The radio device (21, 22, 23; 24, 25, 26; 700; 1000) according to any one of embodiments 52 to 66, comprising:
at least one processor (1050) and a memory (1060) containing instructions executable by said at least one processor (1050), whereby the radio device (21, 22, 23; 24, 25, 26; 700; 1000) is operative to perform a method according to any one of embodiments 13 to 26.

Embodiment 68

A node (100; 900; 1100) for a wireless communication network, the node (100; 900; 1100) being configured to:
  configure a group of radio devices (21, 22, 23; 24, 25, 26; 700; 1000) as candidate relay nodes for communication of a further radio device (11; 12; 500; 1000) with the wireless communication network; and
  communicate with the further radio device (11; 12; 500; 1000) via one or more radio devices (21, 22, 23; 24, 25, 26; 700; 1000) selected as relay node from the group by the further radio device (11; 12; 500; 1000).

Embodiment 69

The node (100; 900; 1100) according to embodiment 68, wherein the node (100; 900; 1100) is configured to configure the group by sending first control information to the radio devices (21, 22, 23; 24, 25, 26; 700; 1000).

Embodiment 70

The node (100; 900; 1100) according to embodiment 68 or 69,
wherein the node (100; 900; 1100) is configured to configure the group based on second control information received from the further radio device (11; 12; 500; 1000).

Embodiment 71

The node (100; 900; 1100) according to any one of embodiments 68 to 70,
wherein the node (100; 900; 1100) is configured to configure the group of radio devices based on at least one of: distance between the further radio device (11; 12; 500; 1000) and the respective radio device (21, 22, 23; 24, 25, 26; 700; 1000), relative velocity of the further radio device (11; 12; 500; 1000) and the respective radio device (21, 22, 23; 24, 25, 26; 700; 1000), quality of a signal transmitted between the further radio device (11; 12; 500; 1000) and the respective radio device (21, 22, 23; 24, 25, 26; 700; 1000).

Embodiment 72

The node (100; 900; 1100) according to any one of embodiments 68 to 71,
wherein the node (100; 900; 1100) is configured to configure the group of radio devices based on at least one of: position of the respective radio device (21, 22, 23; 24, 25, 26; 700; 1000), velocity of the respective radio device (21, 22, 23; 24, 25, 26; 700; 1000), quality of a signal transmitted between the respective radio device (21, 22, 23; 24, 25, 26; 700; 1000) and the node (100; 900; 1100).

Embodiment 73

The node (100; 900; 1100) according to any one of embodiments 68 to 72,
wherein the node (100; 900; 1100) is configured to indicate the group to the further radio device (11; 12; 500; 1000).

Embodiment 74

The node (100; 900; 1100) according to any one of embodiments 68 to 73,
wherein the group of is identified by a group identifier.

Embodiment 75

The node (100; 900; 1100) according to embodiment 74, wherein the node (100; 900; 1100) is configured to:
receive at least one message via the selected one or more radio devices (21, 22, 23; 24, 25, 26; 700; 1000) from the further radio device (11; 12; 500; 1000), the at least one message being scrambled based on the group identifier; and
based on the group identifier, descramble the at least one message.

Embodiment 76

The node (100; 900; 1100) according to embodiment 74 or 75,
wherein the node (100; 900; 1100) is configured to:
send at least one message via the selected one or more radio devices (21, 22, 23; 24, 25, 26; 700; 1000) to the further radio device (11; 12; 500; 1000); and
scramble the at least one message based on the group identifier.

Embodiment 77

The node (100; 900; 1100) according to any one of the embodiments 68 to 76,
wherein the node (100; 900; 1100) is configured to configure a context of a relay link for said communicating with the further radio device (11; 12; 500; 1000) via the selected one or more radio devices (21, 22, 23; 24, 25, 26; 700; 1000), wherein information on the selected one or more further radio devices (21, 22, 23; 24, 25, 26; 700; 1000) is confined to parts of the context maintained by the radio device (11, 12) and the further radio devices (21, 22, 22; 24, 25, 26).

Embodiment 78

The node (100; 900; 1100) according to embodiment 77, wherein the node (100; 900; 1100) is configured to:
in response to the further radio device (11; 12; 500; 1000) newly selecting one or more of the radio devices (21, 22, 23; 24, 25, 26; 700; 1000) from the group as relay node for communication with the wireless communication network, continue said communicating with the further radio device (11; 12; 500; 1000) via the newly selected one or more radio devices (21, 22, 23; 24, 25, 26; 700; 1000), without modification of a part of the context maintained by the node (100; 900; 1100).

Embodiment 79

The node (100; 900; 1100) according to any one of embodiments 68 to 78, wherein the node (100; 900; 1100) is configured to perform the steps of a method according to any one of embodiments 28 to 37.

Embodiment 80

The node (100; 900; 1100) according to any one of embodiments 68 to 79, comprising:
at least one processor (1150) and a memory (1160) containing instructions executable by said at least one processor (1150), whereby the node (100; 900; 1100) is operative to perform a method according to any one of embodiments 27 to 37.

Embodiment 81

A system for a wireless communication network, comprising:
a radio device (11; 12; 500; 1000) and a plurality of further radio devices (21, 22, 23; 24, 25, 26; 700; 1000),
the radio device (11; 12; 500; 1000) being configured to:
configure a group of the further radio devices (21, 22, 23; 24, 25, 26; 700; 1000) as candidate relay nodes for communication with the wireless communication network;

select one or more of the further radio devices (21, 22, 23; 24, 25, 26; 700; 1000) as relay node for communication with the wireless communication network; and
communicate with the wireless communication network via said one or more selected further radio devices (21, 22, 23; 24, 25, 26; 700; 1000), the further radio devices (21, 22, 23; 24, 25, 26; 700; 1000) being configured to:
in response to the radio device (11; 12; 500; 1000) selecting the further radio device (21, 22, 23; 24, 25, 26; 700; 1000) as relay node for communication of the radio device (11; 12; 500; 1000) with the wireless communication network, relay communication between the radio device (11; 12; 500; 1000) and the wireless communication network.

Embodiment 82

The system according to embodiment 81, comprising:
a node (100; 900; 1100) of the wireless communication network,
the node (100; 900; 1100) being configured to:
control configuration of the group of the further radio devices (21, 22, 23; 24, 25, 26; 700; 1000).

Embodiment 83

A computer program comprising program code to be executed by at least one processor (1050) of a radio device (11; 12; 21, 22, 23; 24, 25, 26) for a wireless communication network, whereby execution of the program code causes the radio device (11; 12; 21, 22, 23; 24, 25, 26) to perform a method according to any one of embodiments 1 to 26.

Embodiment 84

A computer program product comprising program code to be executed by at least one processor (1050) of a radio device (11; 12; 21, 22, 23; 24, 25, 26) for a wireless communication network, whereby execution of the program code causes the radio device (11; 12; 21, 22, 23; 24, 25, 26) to perform a method according to any one of embodiments 1 to 26.

Embodiment 85

A computer program comprising program code to be executed by at least one processor (1150) of a node (100; 900; 1100) for a wireless communication network, whereby execution of the program code causes the node (100; 900; 1100) to perform a method according to any one of embodiments 27 to 37.

Embodiment 86

A computer program product comprising program code to be executed by at least one processor (1150) of a node (100; 900; 1100) for a wireless communication network, whereby execution of the program code causes the node (100; 900; 1100) to perform a method according to any one of embodiments 27 to 37.

The invention claimed is:

1. A method of controlling communication in a wireless communication network, the method comprising:
a radio device receiving first control information from the wireless communication network;
the radio device configuring a group of further radio devices as candidate relay nodes for communication with the wireless communication network based on the received first control information;
the radio device selecting one or more of the further radio devices from the group as relay node for communication with the wireless communication network, wherein the selecting of the one or more of the further radio devices is based on distance between the radio device and the respective further radio device, relative velocity of the radio device and the respective further radio device, and quality of a signal transmitted between the radio device and the respective further radio device;
the radio device receiving at least one message from the selected one or more further radio devices, wherein
in a case a single device is selected as the relay node, the at least one message is scrambled based on a cell identifier of the selected relay node, and
in a case more devices are selected as the relay node, the at least one message is scrambled based on a group identifier of the group; and
the radio device communicating with the wireless communication network via the one or more selected further radio devices.

2. The method according to claim 1, comprising:
configuring a context of a relay link for the communicating with the wireless communication network via the one or more selected further radio devices,
wherein information on the selected one or more further radio devices is confined to parts of the context maintained by the radio device and the further radio devices.

3. The method according to claim 2, comprising:
the radio device newly selecting one or more of the further radio devices from the group as relay node for the communication with the wireless communication network, and
the radio device continuing the communication with the wireless communication network via the one or more newly selected further radio devices, without modification of a part of the context maintained at the wireless communication network.

4. A computer program product comprising:
a non-transitory computer readable medium storing program code to be executed by at least one processor of a radio device for a wireless communication network, whereby execution of the program code causes the radio device to perform a method according to claim 1.

5. A method of controlling communication in a wireless communication network, the method comprising:
a radio device receiving, from the wireless communication network, first control information for assigning the radio device to a group of radio devices configured as candidate relay nodes for communication of a further radio device with the wireless communication network; and
in response to the further radio device selecting the radio device as relay node for communication of the further radio device with the wireless communication network, the radio device relaying communication between the further radio device and the wireless communication network, wherein the radio device relaying communication between the further radio device and the wireless communication network comprises
the radio device receiving at least one message from the wireless communication network, the at least one message being scrambled based on a group identifier;
the radio device descrambling the at least one message based on the group identifier; and the radio device relaying the at least one message to the further radio device.

6. The method according to claim 5, comprising:
based on a group identifier, the radio device scrambling the at least one message relayed to the wireless communication network.

7. The method according to claim 5, comprising:
configuring a context of a relay link for the communication of the further radio device with the wireless communication network,
wherein information on the selected one or more further radio devices is confined to parts of the context maintained by the radio device and the further radio devices.

8. The method according to claim 7, comprising:
in response to the further radio device newly selecting the radio device and one or more of the other radio devices from the group as relay node for communication of the further radio device with the wireless communication network,
the radio device continuing the relaying of communication between the further radio device and the wireless communication network, without modification of a part of the context maintained at the wireless communication network.

9. A computer program product comprising:
a non-transitory computer readable medium storing program code to be executed by at least one processor of a node for a wireless communication network, whereby execution of the program code causes the node to perform a method according to claim 5.

10. A method of controlling device-to-device communication in a wireless communication network, the method comprising:
a node of the wireless communication network configuring a group of radio devices as candidate relay nodes for communication of a further radio device with the wireless communication network;
wherein the group is identified by a group identifier;
the node receiving at least one message via a selected one or more radio devices from the further radio device, the at least one message being scrambled based on the group identifier;
based on the group identifier, the node descrambling the at least one message; and
the node communicating with the further radio device via the one or more radio devices selected as relay node from the group by the further radio device.

11. The method according to claim 10, comprising:
the node configuring the group based on second control information received from the further radio device.

12. The method according to claim 10, comprising:
configuring a context of a relay link for the communicating with the further radio device via the selected one or more radio devices,
wherein information on the selected one or more further radio devices is confined to parts of the context maintained by the radio device and the further radio devices.

13. The method according to claim 12, comprising:
in response to the further radio device newly selecting one or more of the radio devices from the group as relay node for communication with the wireless communication network,
the node continuing the communicating with the further radio device via the newly selected one or more radio devices, without modification of a part of the context maintained by the node.

14. A computer program product comprising:
a non-transitory computer readable medium storing program code to be executed by at least one processor of a node for a wireless communication network, whereby execution of the program code causes the node to perform a method according to claim 10.

15. A radio device for a wireless communication network, the radio device comprising:
at least one processor; and
at least one memory storing instructions executable by the at least one processor to perform operations to:
receive first control information from the wireless communication network;
configure a group of further radio devices as candidate relay nodes for communication with the wireless communication network based on the received first control information;
select one or more of the further radio devices from the group as relay node for communication with the wireless communication network, wherein the selecting of the one or more of the further radio devices is based on distance between the radio device and the respective further radio device, relative velocity of the radio device and the respective further radio device, and quality of a signal transmitted between the radio device and the respective further radio device;
receive at least one message from the selected one or more further radio devices, wherein
in a case a single device is selected as the relay node, the at least one message is scrambled based on a cell identifier of the selected relay node, and
in a case more devices are selected as the relay node, the at least one message is scrambled based on a group identifier of the group; and
communicate with the wireless communication network via the one or more selected further radio devices.

16. The radio device of claim 15, wherein the operations further comprise:
indicating the selected one or more further radio devices to the group of further radio devices.

17. The radio device of claim 15, wherein the operations further comprise:
wherein the group is identified by a group identifier;
sending at least one message via the selected one or more further radio devices to the wireless communication network; and
addressing the at least one message by the group identifier to the selected one or more further radio devices.

18. A radio device for a wireless communication network, the radio device comprising:
at least one processor; and
at least one memory storing instructions executable by the at least one processor to perform operations to:
receive, from the wireless communication network, first control information for assigning the radio device to a group of radio devices configured as candidate relay nodes for communication of a further radio device with the wireless communication network; and
in response to the further radio device selecting the radio device as relay node for communication of the further radio device with the wireless communication network, relay communication between the further radio device and the wireless communication network, wherein the relay communication between the further radio device and the wireless communication network comprises
receiving at least one message from the wireless communication network, the at least one message is scrambled based on a group identifier;
descrambling the at least one message based on the group identifier; and
relaying the at least one message to the further radio device.

19. The radio device of claim 18, wherein the operations further comprise:
receiving an indication that the further radio device selected the radio device as relay node for communication of the further radio device with the wireless communication network.

20. The radio device of claim 18, wherein the operations further comprise:
in response to the further radio device setting up a device-to-device communication link to the radio device, the radio device assuming that the further radio device selected the radio device as relay node for communication of the further radio device with the wireless communication network.

21. The radio device of claim 18, wherein the operations further comprise:
wherein the group is identified by a group identifier;
receiving at least one message from the further radio device, the at least one message being addressed by the group identifier to the radio device; and
the radio device relaying the at least one message to the wireless communication network.

22. A node for a wireless communication network, the node comprising:
at least one processor; and
at least one memory storing instructions executable by the at least one processor to perform operations to:
configure a group of radio devices as candidate relay nodes for communication of a further radio device with the wireless communication network;
wherein the group is identified by a group identifier;
receive at least one message via a selected one or more radio devices from the further radio device, the at least one message being scrambled based on the group identifier;
based on the group identifier, descramble the at least one message; and
communicate with the further radio device via the one or more radio devices selected as relay node from the group by the further radio device.

23. The node of claim 22, wherein the operations further comprise:
indicating the group to the further radio device.

24. The node of claim 22, wherein the operations further comprise:
sending at least one message via the selected one or more radio devices to the further radio device; and
scrambling the at least one message based on the group identifier.

* * * * *